United States Patent
Han et al.

(10) Patent No.: US 9,973,315 B2
(45) Date of Patent: May 15, 2018

(54) SYSTEMS AND METHODS FOR SEMI-PERSISTENT SCHEDULING OF WIRELESS COMMUNICATIONS

(71) Applicant: Intel Corporation, Santa Clara, CA (US)

(72) Inventors: Seunghee Han, Kyoungkido (KR); Yuan Zhu, Beijing (CN); Xiaogang Chen, Beijing (CN); Alexei Davydov, Nizhny Novgorod (RU); Jong-Kae Fwu, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 357 days.

(21) Appl. No.: 13/928,722

(22) Filed: Jun. 27, 2013

(65) Prior Publication Data

US 2014/0092829 A1    Apr. 3, 2014

Related U.S. Application Data

(60) Provisional application No. 61/707,784, filed on Sep. 28, 2012, provisional application No. 61/721,436, filed on Nov. 1, 2012.

(51) Int. Cl.
*H04L 5/00* (2006.01)
*H04L 27/26* (2006.01)

(52) U.S. Cl.
CPC .......... *H04L 5/0053* (2013.01); *H04L 5/0035* (2013.01); *H04L 5/005* (2013.01);
(Continued)

(58) Field of Classification Search
None
See application file for complete search history.

(56) References Cited

U.S. PATENT DOCUMENTS

2010/0238845 A1* 9/2010 Love .................. H04B 7/15528
                                                                370/280
2010/0323709 A1   12/2010 Nam et al.
(Continued)

FOREIGN PATENT DOCUMENTS

CN    102067500 A    5/2011
CN    102549965 A    7/2012
(Continued)

OTHER PUBLICATIONS

3GPP TSG RAN WG1 Meeting #71 (R1-124692), "Signaling for PDSCH RE mapping and quasi co-location in DCI format 2D", Nov. 12-16, 2012. All pages.*

(Continued)

*Primary Examiner* — Christopher Crutchfield
*Assistant Examiner* — Tito Pham
(74) *Attorney, Agent, or Firm* — Stoel Rives LLP

(57) ABSTRACT

Methods, systems, and devices for transmission and reception of SPS communications are disclosed herein. User equipment (UE) is configured to receive, in a first subframe, a physical downlink control channel or enhanced physical downlink control channel (PDCCH/EPDCCH) corresponding to semi-persistent scheduling (SPS) activation. The PDCCH/EPDCCH conveys a value of nSCID. The UE configures, based on the SPS activation, a downlink (DL) assignment in a second subframe for receiving an SPS physical downlink shared channel (PDSCH) without a corresponding PDCCH/EPDCCH. The UE determines a reference signal sequence corresponding to the SPS PDSCH using $n_{SCID}$ derived from the PDCCH/EPDCCH corresponding to the associated SPS activation. The UE receives the SPS PDSCH in a second subframe. The UE processes the SPS PDSCH based on the reference signal sequence for the SPS PDSCH in the second subframe using the $n_{SCID}$ derived (Continued)

from the PDCCH/EPDCCH corresponding to the associated SPS activation. The UE is configured for transmission mode 10 (TM10).

6 Claims, 9 Drawing Sheets

(52) U.S. Cl.
CPC ........ *H04L 5/0051* (2013.01); *H04L 27/2613* (2013.01); *Y02D 70/12* (2018.01); *Y02D 70/126* (2018.01); *Y02D 70/14* (2018.01); *Y02D 70/20* (2018.01)

(56) References Cited

U.S. PATENT DOCUMENTS

| | | | |
|---|---|---|---|
| 2011/0128896 A1 | 6/2011 | Huang et al. | |
| 2011/0182245 A1* | 7/2011 | Malkamaki | H04L 1/1812 370/329 |
| 2011/0239072 A1 | 9/2011 | Cai | |
| 2011/0286406 A1* | 11/2011 | Chen | H04L 1/1861 370/329 |
| 2012/0087321 A1* | 4/2012 | Han | H04L 5/005 370/329 |
| 2012/0113910 A1 | 5/2012 | Jen | |
| 2012/0176884 A1* | 7/2012 | Zhang | H04B 7/024 370/203 |
| 2012/0176996 A1* | 7/2012 | Kim | H04W 72/0413 370/329 |
| 2012/0327873 A1* | 12/2012 | Kim | H04L 5/0007 370/329 |
| 2013/0176952 A1* | 7/2013 | Shin | H04L 5/001 370/329 |
| 2013/0178220 A1* | 7/2013 | Lee | H04L 5/0007 455/450 |
| 2013/0242770 A1* | 9/2013 | Chen | H04L 5/1469 370/252 |
| 2014/0016714 A1* | 1/2014 | Chen | H04B 7/024 375/260 |

FOREIGN PATENT DOCUMENTS

| | | |
|---|---|---|
| EP | 2421191 A2 | 2/2012 |
| EP | 2654358 A1 | 10/2013 |
| JP | 2014508471 A | 4/2013 |
| JP | 2013545421 A | 12/2013 |
| WO | 2009115904 A3 | 11/2009 |
| WO | 2011039625 A1 | 4/2011 |
| WO | 2012079517 A1 | 6/2012 |
| WO | 2012081867 A2 | 6/2012 |
| WO | 2012109542 A1 | 8/2012 |

OTHER PUBLICATIONS

International Search Report and Written Opinion received for PCT Patent Application No. PCT/US2013/061761, dated Jan. 23, 2014, 14 pages.
3GPP TS 36.211, "3rd Generation Partnership Project; Technical Specification Group Radio Access Network; Evolved Universal Terrestrial Radio Access (E-UTRA); Physical Channels and Modulation", (Release 11) V11.0.0, Sep. 2012, 27 pages.
Alcatel-Lucent, "Remaining issues of Downlink Control Signalling for CoMP", R1-123142, 3GPP TSG RAN WG1 Meeting #70, Qingdao, China, Agenda Item 7.5.4, Aug. 13-17, 2012, 5 pages.
HTC, "Flexible DL DM-RS Configuration for CoMP", R1-120263, 3GPP TSG RAN WG1 Meeting #68, Dresden, Germany, Agenda Item 7.5.4.1, Feb. 6-10, 2012, 5 pages.
Intel Corporation, "Configuration of semi-persistent scheduling in TM10", R1-124721, 3GPP TSG-RAN WG1 #71, New Orleans, LA, U.S., Agenda Item 6.2.2.5, Nov. 12-16, 2012, 5 pages.
ZTE, "Downlink control signaling for CoMP", R1-124626, 3GPP TSG RAN WG1 Meeting #70bis, San Diego, CA, USA, Agenda Item 7.4.1, Oct. 8-12, 2012, 8 pages.
Nokia, Nokia Siemens Networks, "On DM-RS scrambling sequence intialization for ePDCCH", R1-122421, 3GPP TSG-RAN WG1 Meeting #69, Prague, Czech Republic, Agenda Item 7.6.3, May 21-25, 2012, 2 pages.
NTT Docomo, "UE-specific DL DM-RS Sequence for Rel-11 CoMP", R1-120407, 3GPP TSG RAN WG1 Meeting #68, Dresden, Germany, Agenda Item 7.5.4.1, Feb. 6-10, 2012, 4 pages.
17196578.3, Partial European Search Report, dated Mar. 9, 2018, 13 pages.

* cited by examiner

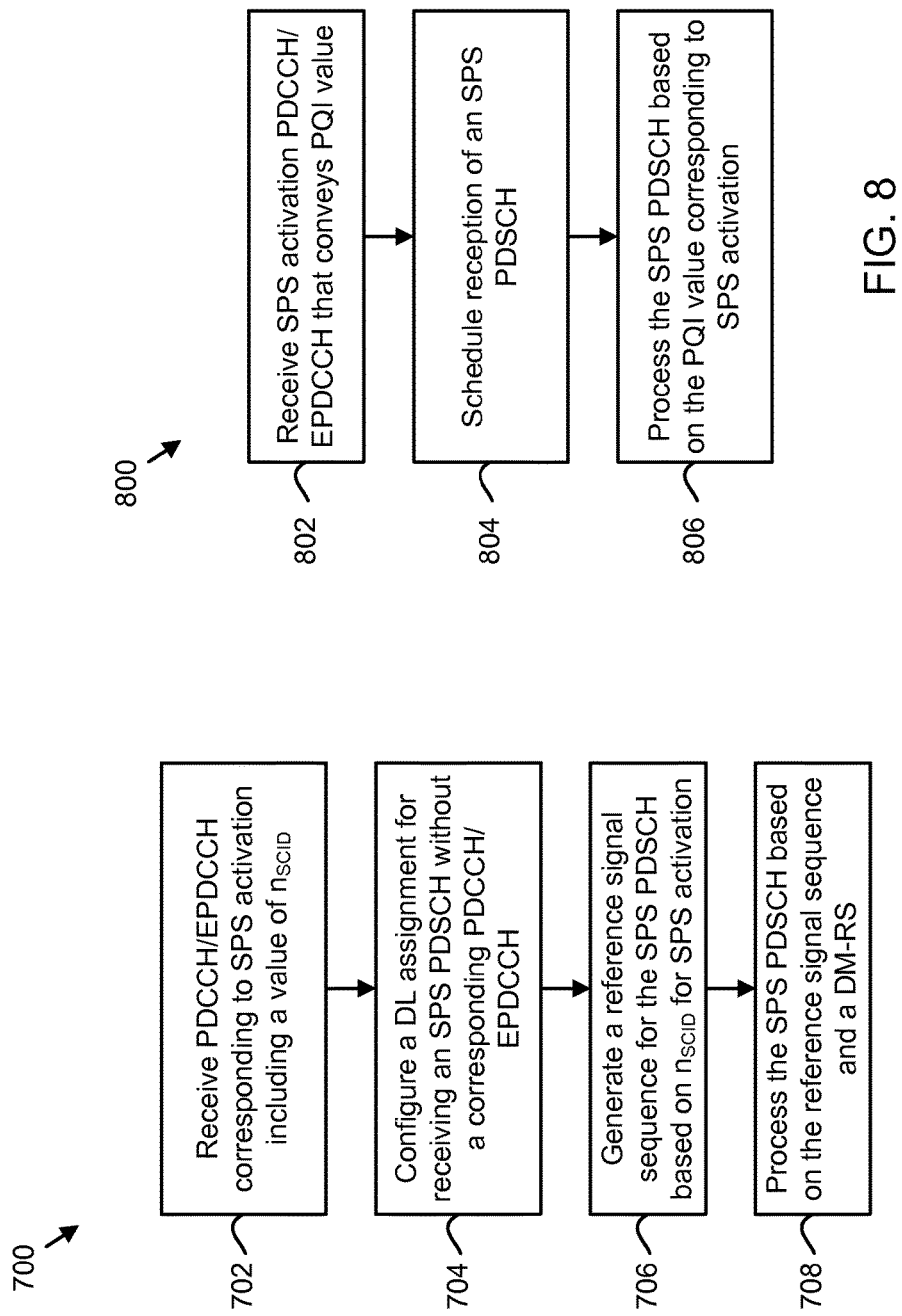

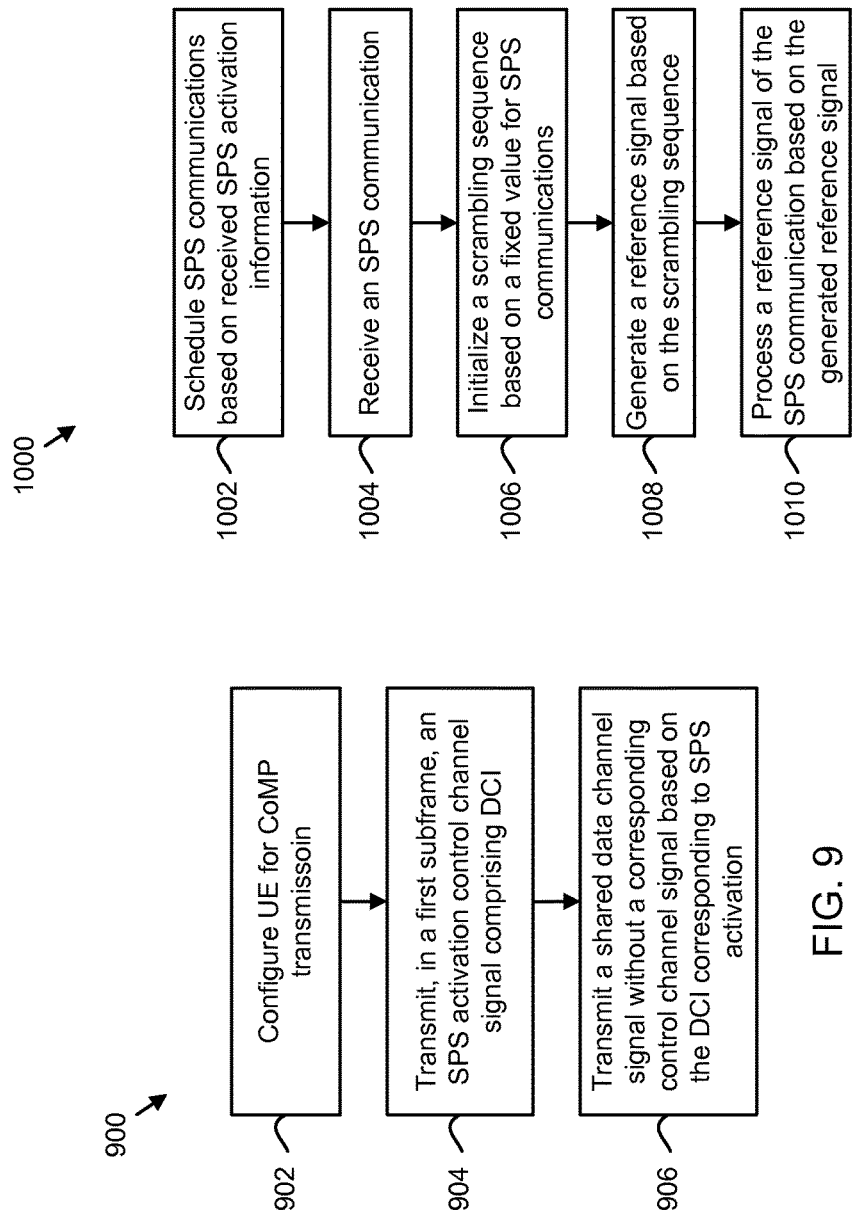

SYSTEMS AND METHODS FOR SEMI-PERSISTENT SCHEDULING OF WIRELESS COMMUNICATIONS

RELATED APPLICATION

This application claims the benefit under 35 U.S.C. § 119(e) of U.S. Provisional Application No. 61/721,436, filed Nov. 1, 2012 and U.S. Provisional Application No. 61/707,784, filed Sep. 28, 2012, which is hereby incorporated by reference herein in its entirety.

TECHNICAL FIELD

The present disclosure relates to wireless communication networks. Specifically, this disclosure relates to systems and methods for semi-persistent scheduling in wireless communication systems.

BRIEF DESCRIPTION OF THE DRAWINGS

FIG. 7 is a schematic flow chart diagram illustrating a method for receiving SPS communications consistent with embodiments disclosed herein.

FIG. 8 is a schematic flow chart diagram illustrating another method for receiving SPS communications consistent with embodiments disclosed herein.

FIG. 9 is a schematic flow chart diagram illustrating a method for providing SPS communications consistent with embodiments disclosed herein.

FIG. 10 is a schematic flow chart diagram illustrating another method for receiving SPS communications consistent with embodiments disclosed herein.

DETAILED DESCRIPTION OF PREFERRED EMBODIMENTS

Figure 1:
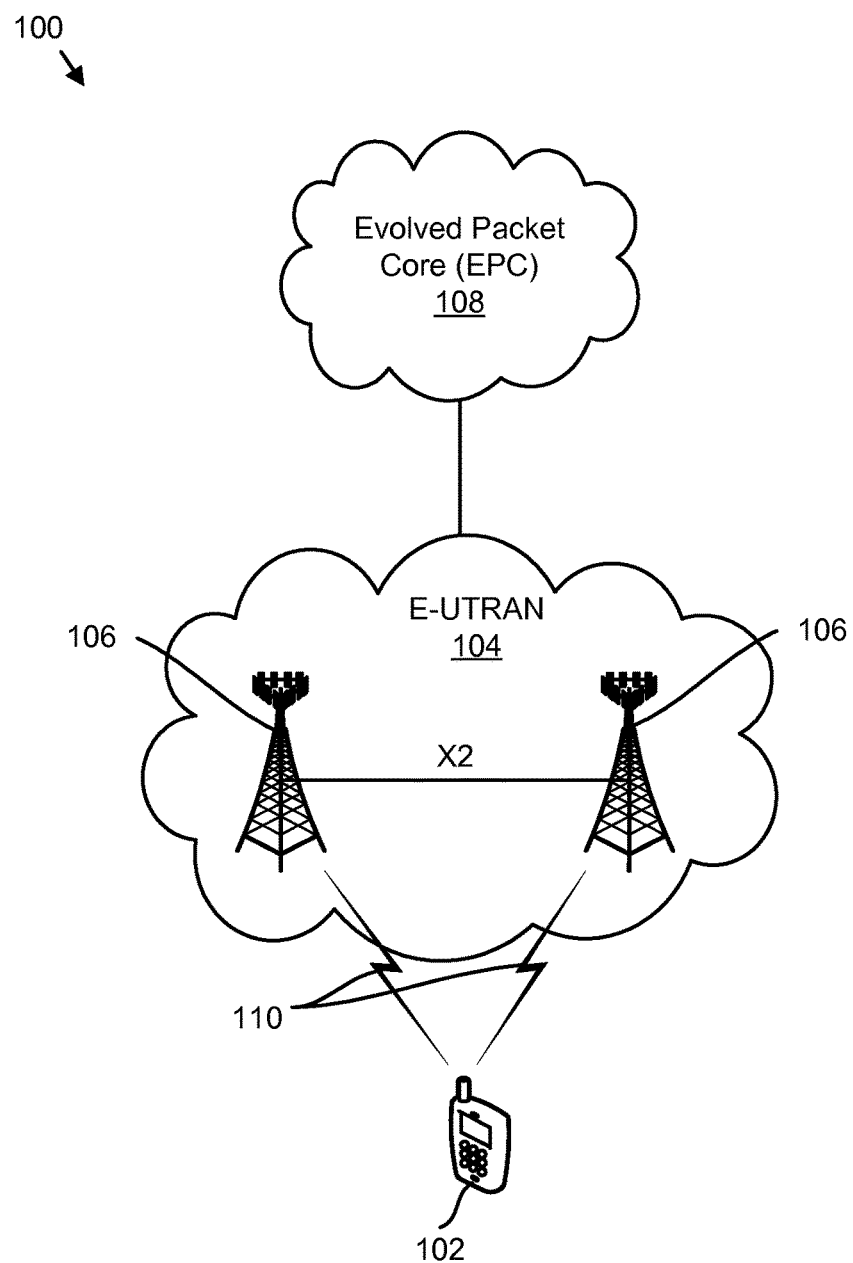
FIG. 1 is a schematic diagram illustrating a communication system for providing communication services to a wireless mobile device consistent with embodiments disclosed herein.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an UTRAN or E-UTRAN, which communicates with the wireless mobile device, known as user equipment (UE). A downlink (or DL) transmission can be a communication from the base station (or eNB) to the wireless mobile device (or UE), and an uplink (or UL) transmission can be a communication from the wireless mobile device to the base station.

Common goals in many wireless networks include increased data rates, increased efficiency in the use of a transmission spectrum, and better coverage. One way to increase efficiency, data rates, and/or coverage near cell boundaries includes use of coordinated multipoint (CoMP) transmissions which involve the transmission of the same signal from different transmission points. Thus, multiple transmission points, as well as the UE, need to know the data and configuration details for sending the signal. Another way to increase efficiency is the use of semi-persistent scheduling (SPS). SPS allows reduction of control data needed to control physical layer (layer 1) signaling and can thus reduce the control data overhead for small but frequent transmissions, such as in voice over internet protocol (VoIP). However, when CoMP is used to send SPS data, control information regarding how the UE should process the data and how the transmission point should send the data is not provided. Thus, a UE may not be able to receive transmitted data and an eNB may not be able to transmit data in a manner receivable by the UE.

One example of control information that is important to proper transmission and/or reception of data in the downlink direction are parameters and indicators for generation of a reference signal. Specifically, demodulation reference signals (DM-RS) in the downlink direction are scrambled before sending. If the UE receives a control signal with parameters indicating how the data was scrambled, the UE can properly receive and utilize the DM-RS for channel estimation (etc.), and properly demodulate the downlink data. However, if the UE does not know how the reference signals are scrambled, the UE will not be able to correctly receive the reference signals and/or demodulate data.

The present application discloses systems, methods, and apparatuses for receiving downlink data during SPS and/or CoMP transmission. According to one embodiment, a UE is configured to receive physical layer data communications without corresponding physical layer control communications based on control information used to receive SPS activation information. According to another embodiment, the UE is configured to receive physical layer data communications without corresponding physical layer control communications based on values configured using signaling above the physical layer, such as radio resource configuration (RRC) layer signaling. According to yet another embodiment, the UE is configured to receive physical layer data communications without corresponding physical layer control communications based on predetermined fixed values for SPS communications.

As used herein the term physical layer control communications is given to encompass control signaling at a physical layer (e.g. layer 1) of a communication protocol. Examples of physical layer control communications in 3GPP LTE include physical uplink control channel (PUCCH) communications and physical downlink control channel (PDCCH) communications. In one embodiment, the term PDCCH includes either legacy PDCCH or Enhanced PDCCH (EPDCCH). Additionally, the term PDCCH/EPDCCH may be used herein to reference a control channel that includes either an PDCCH or an EPDCCH. Furthermore, the terms PDCCH, EPDCCH, PDSCH, or the like may refer to the channel and/or a transmission on the channel. For example, the term PDCCH may refer to a PDCCH transmission, PDCCH signal, or other message or signal on the PDCCH.

The term "physical layer data communications" is given to encompass data signaling or shared layer signaling at the physical layer (layer 1) of a communication protocol. For example, the data signaling may include application data, higher layer control data, or other data which is not used for controlling the physical layer, but may be used by a higher layer or application. Examples of physical layer data communications in 3GPP LTE include physical uplink shared channel (PUSCH) communications and physical downlink shared channel (PDSCH) communications. One of skill in the art will recognize that other protocols may include similar physical or layer 1 communications which are encompassed within the terms physical layer control communication and physical layer data communication.

In order to improve clarity and to avoid obscuring the disclosure, the embodiments and examples provided herein focus on systems, methods, and apparatuses that operate based on a 3GPP LTE standard. Although terminology and examples of operation are generally directed toward LTE, one of skill in the art will recognize that other communication standards are also subject to the teaching herein with little or no variation. Terminology such as UE, eNB, PDSCH, PDCCH, or other terms used in the specification should be understood as encompassing other similar systems or components used in other communication protocols.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

FIG. 1 illustrates one embodiment of a communication system 100 for providing communication services to a UE 102. The communication system 100 includes an E-UTRAN 104, that includes eNBs 106, and an evolved packet core (EPC) 108. According to one embodiment, the communication system 100 is configured to provide SPS communications to the UE 102 via eNBs 106. In one embodiment, the SPS communications are sent from both eNBs 106 such that the UE 102 receives the communications from two different transmission points, according to CoMP transmission.

The UE 102 may include any type of communications and/or computing device. Example UE 102 includes phones, smartphones, personal digital assistants (PDAs), tablet computers, notebook computers, ultrabook computers, or the like. The UE 102 may include devices configured to communicate using a 3GPP standard such as universal mobile telecommunication system (UMTS), LTE, LTE-Advanced (LTE-A), or the like. Similarly, the UE 102 may include a mobile wireless device configured to communicate based on any wireless communication standard.

The E-UTRAN 104 is configured to provide wireless data access to the UE 102 and/or a plurality of other wireless mobile devices. The E-UTRAN 104 provides wireless data, voice, and/or other communications available through the EPC 108 to the UE 102. In one embodiment, the E-UTRAN 104 operates according to a wireless protocol, such as a wireless protocol that the UE 102 is capable of using. The eNBs 106 may implement transmission point and RNC functions. The eNBs 106 are configured to communicate with each other via an X2 interface, as depicted.

The eNBs 106 are both depicted in communication 110 with the UE 102. According to one embodiment, the eNBs 106 provide the same signals and/or data to arrive at the UE 102 at approximately the same time, or within a threshold time, as in CoMP transmission. In one embodiment, the UE 102 receives both of the signals. The UE 102 may be configured to receive CoMP transmissions and process the separate transmission as a single data transmission. In one embodiment, the UE 102 may be capable of receiving CoMP transmissions simply because it is capable of receiving multipath signals. Thus, no special processing at the UE 102, besides processing for multipath signals, may be required to receive CoMP transmissions. In another embodiment, the UE 102 may be configured to receive signals from separate transmission points at approximately the same time. Although the UE 102 is shown in communication with two eNBs 106, some embodiments may be capable of CoMP transmissions using three or more transmission points.

Future releases of 3GPP LTE are scheduled to include functionality for a new transmission mode called transmission mode 10 (TM10). TM10 enables CoMP transmission to a UE 102 and/or reception by the UE 102. As discussed above, CoMP is helpful for transmitting to a UE 102 located at cell boundaries, where received power from a transmitting cell can be low. Low received power can increase loss of packets and/or require retransmission of messages. Lost packets and retransmissions can cause reduce data rates as well as reduced efficient use of processing power and energy at the UE 102 and the eNB 106. CoMP transmission can increase the total received power for the UE 102 because the same data is sent from multiple transmission points, even if none of them are near the UE 102.

Figure 2A:
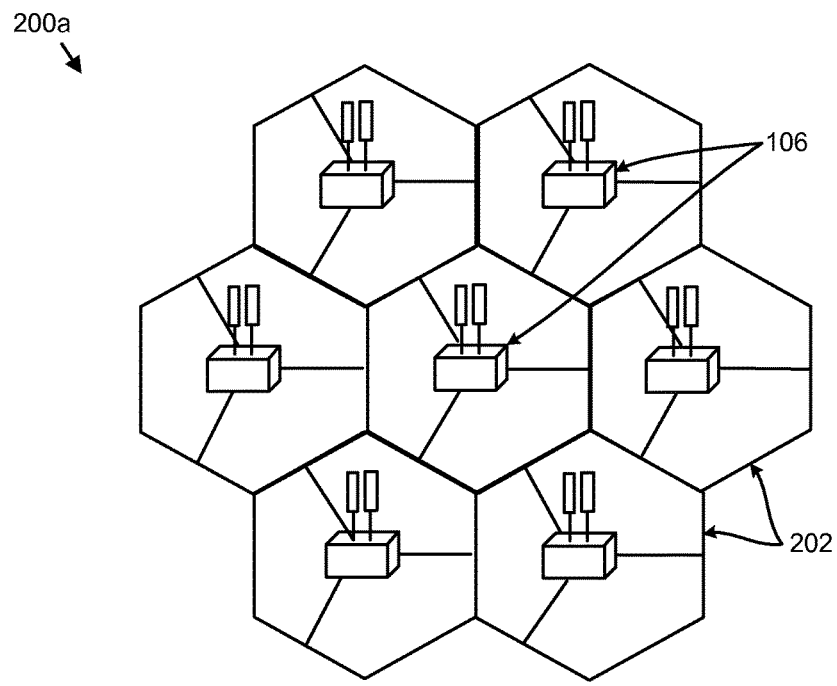
FIGS. 2A, 2B, and 2C are schematic diagrams illustrating transmission point arrangements in networks for coordinated multipoint (CoMP) transmission consistent with embodiments disclosed herein.
Figure 2B:
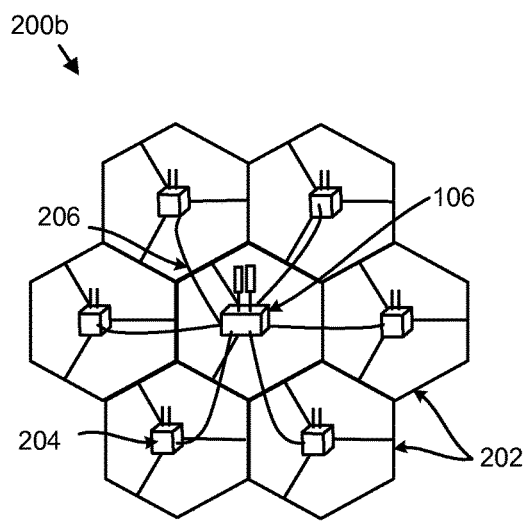
Figure 2C:
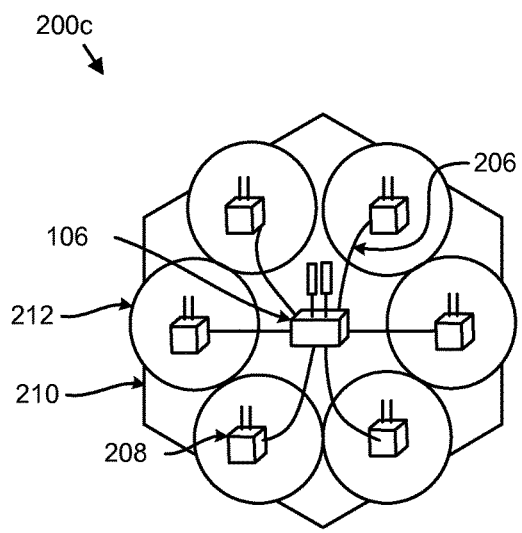

FIGS. 2A-2C are schematic diagrams illustrating example transmission point arrangements in which CoMP transmissions may be used. FIG. 2A illustrates a homogenous network 200a with multiple eNBs 106. The eNBs 102 each cover different regions to create adjacently covered cells 202. A wireless mobile device located near one of the boundaries between cells 202 may suffer from low signal strength from a primary cell, or primary serving eNB 106. Using intra-site CoMP, signals from both the primary serving cell and a neighboring cell may be transmitted to boost the overall signal strength received by the UE and reduce data loss and/or required retransmissions.

FIG. 2B illustrates a homogeneous network 200b, similar to the homogenous network 200a of FIG. 2A. However, only a single eNB 106 is shown with neighboring cells 202 covered by high transmission (Tx) power radio resource heads (RRHs) 204. The high Tx power RRHs 204 include radios capable of covering a similar size area as the eNB 106 but allow much of the processing and/or control to be performed elsewhere, such as at the eNB 106. An optical fiber connection 206 between the eNB 106 and each high Tx power RRH 204 provides communication between the eNB 106 and high Tx power RRHs 204. For example, the eNB 106 can instruct a high Tx power RRH 204 to transmit the same or similar signal as the eNB 106 in order to perform a CoMP transmission.

FIG. 2C illustrates a non-homogenous network 200c with a single eNB 106 and multiple low Tx power RRHs 208 each providing coverage within a macro cell 210 covered by the eNB 106. Each low Tx power RRH 208 has a coverage area 212 at least partially within the macro cell 210. The low Tx power RRHs 208 may have either the same or different cell IDs as the macro cell 210. For example, a UE 102 may operate as if it were connected to the same cell regardless of whether a low Rx power RRH 208 or the eNB 106 is used as a primary transmission point. Similar to the embodiments of FIGS. 2A and 2B, CoMP transmission may be used to transmit to a UE 102 near a boundary of the macro cell 210 and/or the RRH coverage areas 212. One of skill in the art will recognize that, in any of the embodiments illustrated in FIG. 2A, 2B, or 2C, CoMP transmission may be used even at locations not near a boundary, for example, if reduced received power is experienced by the UE 102.

As discussed above, efficient use of wireless networks and/or spectrums can also be increased by reducing control data overhead. Control data may be used to inform a mobile station or radio network controller of the settings used to transmit data and/or the timing to transmit the data. In some embodiment, the control data is necessary for the mobile station or the base station to be able to receive and/or process the signal. For dynamically communicated data, control data is needed to control how and/or when a mobile station receives data signals. Often, traditionally dynamically scheduled data items tend to be larger, less frequent, and/or unpredictable. Because dynamically scheduled items tend to be larger, the amount of control data per amount of higher layer data tends to be quite small.

However, in situations where small amounts of data are repeatedly being sent, the control signaling can amount to a large proportional overhead for the amount of data being sent. This can be the case with data requiring real-time communications. For example, with VoIP a small amount of voice data may be sent every 10 or 20 milliseconds. If each of these packets is sent dynamically, the control data can constitute a large overhead. In other words, the amount of control data sent per amount of VoIP data can be quite high.

Figure 3:
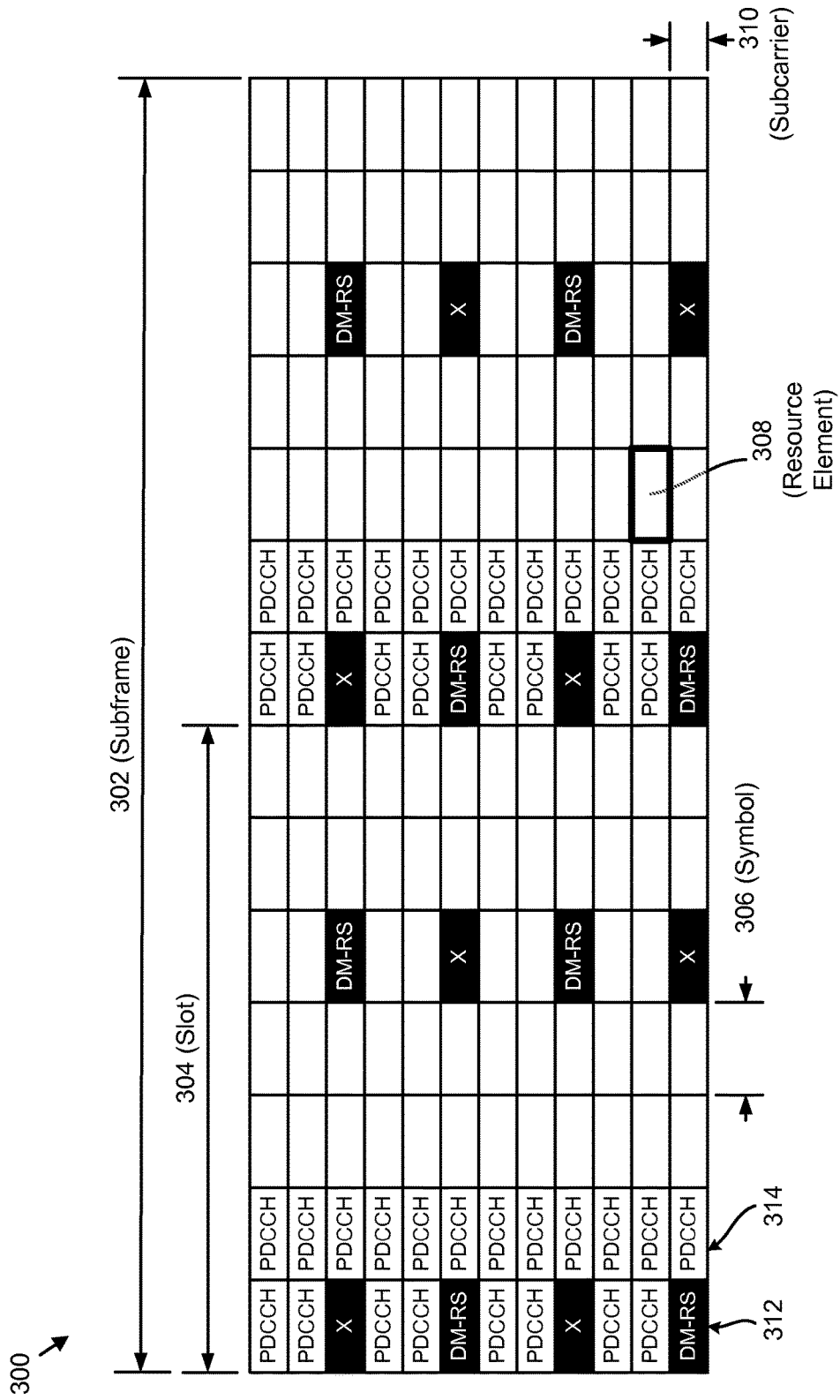
FIG. 3 is a schematic diagram of a resource grid illustrating reference signals and control signals within a resource block pair consistent with embodiments disclosed herein.

FIG. 3 illustrates a resource grid 300 of a DL primary resource block pair during one subframe 302 with a normal cyclic prefix. The subframe 302 is divided into two slots 304 and 14 symbols 306. Each resource block includes 12 subcarriers 310 during one slot 304. The intersection of a single subcarrier 310 and single symbol 306 is referred to as a resource element 308. One of skill in the art will understand that the structure of the resource block pair is given by way of example only and can vary significantly between different standards, versions of standards, and/or other common wireless communication methods.

The resource grid 300 illustrates a configuration for control signals 314 (PDCCH), reference signals 312 (DM-RS), and resource elements 308 which may be available for physical layer data signals (such as PDSCH). As illustrated, PDCCH communications are transmitted at the beginning of a slot and PDSCH communications may be assigned later in the slot. As used herein, the term PDSCH is given to broadly mean any signal mapped to a resource element 308 and/or subframe 302 that includes physical layer data, such as PDSCH data. Blank (X) resource elements 308 are also illustrated. According to one embodiment, reference signals 312 are only transmitted in resource blocks in which a corresponding PDSCH is mapped.

In order to reduce the proportional control overhead, it is sometimes advantageous to implement SPS. This is possible for certain communication types where the frequency at which data is sent is known, or can be controlled. VoIP is an example of data that may be subject to SPS. In SPS, the sending of information is scheduled for specific times and/or intervals. The SPS allows the UE 102 and the eNB 106 to have an understanding about when and how data will be sent so that the control signaling (such as the PDCCH of FIG. 3) can be reduced or omitted. For example, a control signal may not need to be sent each time data needs to be sent. This can significantly reduce the control overhead.

When transmitting DL data, an eNB 106 often includes a UE-specific reference signal (such as a DM-RS of FIG. 3) within the DL transmission. The reference signal is a signal with a sequence and/or signature that is known to, or can be determined by, the UE 102. Because the reference signal is known, the UE 102 can estimate a channel and/or determine how best to receive data signals based on how the reference signal actually appears to the UE 102 upon reception. For example, if the reference signal is distorted or attenuated when received, the UE 102 can determine that the data signals are similarly affected and demodulate the data signals accordingly. Generally, the UE 102 and the eNB 106 must communicate so that both know the sequence and/or signature of the reference signal. In the DL direction, the eNB 106 must know the reference signal sequence in order to transmit it and the UE 102 must know the reference signal sequence in order to use it as a reference.

Figure 4:
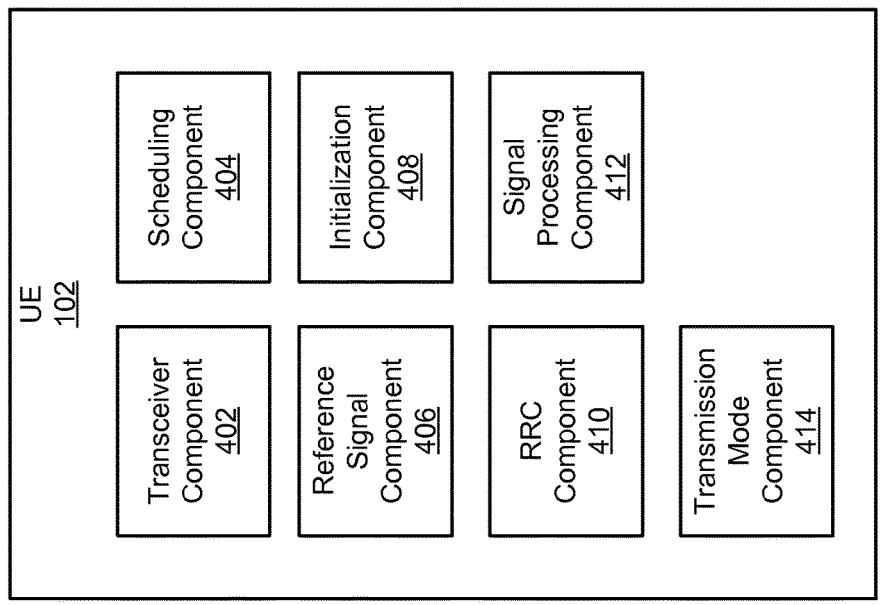
FIG. 4 is a schematic block diagram illustrating components of user equipment (UE) consistent with embodiments disclosed herein.

FIG. 4 is a block diagram illustrating example components of a UE 102. The UE 102 includes a transceiver component 402, a scheduling component 404, a reference signal component 406, an initialization component 408, an RRC component 410, a signal processing component 412, and a transmission mode component 414. In one embodiment, the UE 102 is configured to receive physical layer data signals without physical layer control signals transmitted using CoMP transmission.

The transceiver component 402 is configured to communicate with an eNB 106 or other radio. The transceiver component 402 may include one or more antennas and/or processing circuitry to send and receive messages wirelessly. The transceiver component 402 may operate to send and receive messages on behalf of other components or a processor of the UE 102.

According to one embodiment, the transceiver component 402 is configured to receive PDCCH communications. The PDCCH communications may include downlink control information (DCI) to inform the UE how to receive PDSCH and/or reference signals corresponding to the PDSCH.

In 3GPP LTE, UE-specific reference signals are supported for transmission of PDSCH and are transmitted on antenna port(s) p=5, p=7, p=8, and/or p=7, 8, . . . , u+6, where u is the number of layers used for transmission of the PDSCH. UE-specific reference signals are present and are a valid reference for PDSCH demodulation only if the PDSCH transmission is associated with the corresponding antenna port. 3GPP TS 36.211, Section 7.1 defines PDSCH transmissions that are associated with a specific antenna port. UE-specific reference signals are transmitted only on the resource blocks upon which the corresponding PDSCH is mapped. The UE-specific reference signal is not transmitted in resource elements with the same index as resource elements in which one of the physical channels or physical signals other than UE-specific reference signals are transmitted, regardless of their antenna port p. For example, blank resource elements 308 (indicated by an "X") in the resource map 300 indicate locations where transmissions are not allowed.

In one embodiment, UE-specific references signals may be scrambled. Because the reference signal is scrambled, the UE 102 and transmission point (such as an eNB 106) must be configured to transmit/receive a reference signal that has been initialized in the same way. For antenna port 5, the UE-specific reference-signal sequence $r_{n_s}(m)$ is defined by:

$$r_{n_s}(m) = \frac{1}{\sqrt{2}}(1-2c(2m)) + j\frac{1}{\sqrt{2}}(1-2c(2m+1)) \quad (1)$$

where $m = 0, 1, \ldots, 12N_{RB}^{PDSCH} - 1$

Where $N_{RB}^{PDSCH}$ denotes the bandwidth in resource blocks of the corresponding physical data channel transmission.

The pseudo-random sequence c(i) is defined in Section 7.2 of 3GPP TS 36.211. The pseudo-random sequence generator is initiated at the start of each subframe with:

$$c_{init} = \left(\left\lfloor\frac{n_s}{2}\right\rfloor + 1\right)(2N_{ID}^{cell} + 1)2^{16} + n_{RNTI} \quad (2)$$

where $n_{RNTI}$ is a value of a radio network temporary identifier (RNTI) defined in 3GPP TS 36.321.

For any of the antenna ports p=7, 8, . . . , 14, the reference-signal sequence r(m) is defined by:

$$r(m) = \frac{1}{\sqrt{2}}(1-2c(2m)) + j\frac{1}{\sqrt{2}}(1-2c(2m+1)) \quad (3)$$

where $m = \begin{cases} 0, 1, \ldots, 12N_{RB}^{PDSCH} - 1 & \text{normal cyclic prefix} \\ 0, 1, \ldots, 16N_{RB}^{PDSCH} - 1 & \text{extended cyclic prefix} \end{cases}$ The pseudo random sequence generator is initialized at the start of each subframe with:

$$c_{init} = \left(\left\lfloor\frac{n_s}{2}\right\rfloor + 1\right)(2N_{ID}^{(n_{SCID})} + 1)2^{16} + n_{SCID} \quad (4)$$

where the quantity $N_{ID}^{(n_{SCID})}$ selects a value from a virtual cell identity quantity $N_{ID}^{(i)}$. The quantities $N_{ID}^{(i)}$, i=0, 1 are given by $n_{ID}^{(i)} = n_{ID}^{cell}$ if no value for $n_{ID}^{(i)}$ is provided by higher layers or if DCI format 1A is used for the DCI associated with the PDSCH transmission. If scrambling identities $n_{ID}^{DMRS,i}$ are provided by higher layers (such as at the RRC layer) $n_{ID}^{(i)} = n_{ID}^{DMRS,i}$. The value of $n_{SCID}$ is zero unless specified otherwise. For a PDSCH transmission on ports 7 or 8, $n_{SCID}$ is given by the DCI format 2B or 2C associated with the PDSCH transmission. In the case of DCI format 2B, $n_{SCID}$ is indicated by the scrambling identity field according to Table 1.

TABLE 1

Mapping of scrambling identity field in DCI format 2B to $n_{SCID}$ values for antenna ports 7 and 8

| Scrambling identity field in DCI format 2B | $n_{SCID}$ |
|---|---|
| 0 | 0 |
| 1 | 1 |

In the case of DCI format 2C, $n_{SCID}$ is given by Table 2.

TABLE 2

Antenna port(s), scrambling identity, and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In addition to the signaling for scrambling identities, a parameter set indicator, such as PDSCH resource element (RE) Mapping and Quasi-Co-Location Indicator (PQI), may be used to configure transmissions.

In one embodiment, the PQI may be included in DCI signaling. In one embodiment, a new DCI bit for PQI may be added to format 2C for CoMP (TM10). This new bit, together with $n_{SCID}$, may be used to select a PQI parameter set from four parameter sets that may be configured by higher layers, such as RRC signaling. For example, $n_{SCID}$=0 and PQI=0 may correspond to a first parameter set, $n_{SCID}$=0 and PQI=1 may correspond to a second parameter set, $n_{SCID}$=1 and PQI=0 may correspond to a third parameter set, and $n_{SCID}$=1 and PQI=1 may correspond to a fourth parameter set.

In another embodiment, two new DCI bits may be added to format 2C for CoMP transmissions (such as in TM10). For example, PQI=0 may correspond to a first parameter set, PQI=1 may correspond to a second parameter set, PQI=2 may correspond to a third parameter set, and PQI=3 may correspond to a fourth parameter set.

For example, a UE 102 configured in TM10 for a given serving cell can be configured with up to 4 parameter sets by higher layer signaling to decode PDSCH according to a detected PDCCH/EPDCCH with DCI format 2D intended for the UE 102 and the given serving cell. The UE 102 may use the parameter set according to the value of the PQI field in the detected PDCCH/EPDCCH with DCI format 2D for determining the PDSCH RE mapping and PDSCH antenna port quasi co-location. For PDSCH without a corresponding PDCCH, the UE 102 may use the parameter set indicated in the PDCCH/EPDCCH with DCI format 2D corresponding to the associated SPS activation for determining the PDSCH RE mapping and PDSCH antenna port quasi co-location.

In the case of DCI format 2D, the PQI may be given by Table 3.

TABLE 3

PDSCH RE Mapping and Quasi-Co-Location
Indicator (PQI) Field in DCI Format 2D

| Value of PQI field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining PDSCH RE mapping and PDSCH antenna port quasi co-location may be configured via higher layer signaling for each parameter set:
'Number of cell specific reference signal (CRS) antenna ports for PDSCH RE mapping'.
'CRS frequency shift for PDSCH RE mapping'.
'Multi-Broadcast Single Frequency Network (MBSFN) subframe configuration for PDSCH RE mapping'.
'Zero-power channel state information—reference signal (CSI-RS) resource configuration for PDSCH RE mapping'.
'PDSCH starting position for PDSCH RE mapping'.
'CSI-RS resource configuration identity for PDSCH RE mapping'.

A UE 102 configured in TM10 for a given serving cell can be configured with a parameter set selected from the four parameter sets in Table 2 by higher layer signaling for determining the PDSCH RE mapping and PDSCH antenna port quasi co-location to decode PDSCH according to a detected PDCCH/EPDCCH with DCI format 1A intended for the UE and the given serving cell. The UE 102 may use the configured parameter set, determining the PDSCH RE mapping and PDSCH antenna port quasi co-location for decoding PDSCH corresponding to detected PDCCH/EPDCCH with DCI format 1A and PDSCH without a corresponding PDCCH associated with SPS activation indicated in PDCCH/EPDCCH with DCI format 1A.

Regarding antenna ports quasi co-location for PDSCH, the UE 102 configured in any of transmission modes 1-10 for a serving cell may assume the antenna ports 0-3 of the serving cell are quasi co-located with respect to delay spread, Doppler spread, Doppler shift, average gain, and average delay. A UE 102 configured in transmission mode 8-10 for a serving cell may assume the antenna ports 7-14 of the serving cell are quasi co-located for a given subframe with respect to delay spread, Doppler spread, Doppler shift, average gain, and average delay. A UE 102 configured in transmission mode 1-9 for a serving cell may assume the antenna ports 0-3, 5, 7-22 of the serving cell are quasi co-located with respect to Doppler shift, Doppler spread, average delay, and delay spread.

A UE 102 configured in TM10 for a serving cell may be configured with one of two quasi co-location types for the serving cell by a higher layer parameter "qcl-Operation" to decode PDSCH according to transmission scheme associated with antenna ports 7-14. In type A, the UE 102 may assume the antenna ports 0-3, 7-22 of a serving cell are quasi co-located with respect to delay spread, Doppler spread, Doppler shift, and average delay. In type B, the UE 102 may assume the antenna ports 15-22 corresponding to the CSI-RS resource configuration identified by the higher layer parameter "qcl-CSI-RS-ConfigNZPId-r11" and the antenna ports 7-14 associated with the PDSCH are quasi co-located with respect to Doppler shift, Doppler spread, average delay, and delay spread.

When the UE 102 is configured for TM10 (e.g. for CoMP transmission), DCI format 2D may be used. DCI format 2D may convey values for both $n_{SCID}$ and for PQI. The contents of different DCI formats are set forth in 3GPP TS 36.212, Section 5.3.3.1. For DCI format 2D, the following may be transmitted: a carrier indicator, a resource allocation header, a resource block assignment, a transmit power control command for PUCCH, a downlink assignment index, a HARQ process number, antenna ports, a scrambling identity, a number of layers, a sounding reference signal request, and/or other data or information fields.

In one embodiment, the transceiver component 402 may receive PDCCH including any of the above parameters. For example, in one embodiment, the DCI includes transmission parameters to configure how information in a following PDSCH should be received. The DCI may include a scrambling identity ($n_{SCID}$) for a corresponding PDSCH. Similarly, the DCI may include a PQI value for selecting transmission parameters for a corresponding PDSCH. The DCI may then be used to configure the UE 102 to receive and/or process the corresponding PDSCH. In one embodiment, a PDCCH may be used to activate a SPS process. Within the present disclosure, the terms SPS process and SPS session may be used interchangeably to indicate the configuration, transmission, and/or reception of SPS communications. For example, SPS configuration information may be sent at a higher layer, such as over PDSCH and a PDCCH may be used to activate an SPS process.

According to one embodiment, the transceiver component 402 is configured to receive PDSCH communications which include user data, control data for higher layers (such as RRC layer signaling), or the like. In one embodiment, the transceiver component 402 receives SPS configuration information. For example, in 3GPP LTE, SPS may be enabled by RRC signaling at the RRC signaling layer. The RRC information may include uplink SPS configuration information including: a cell radio network temporary identifier (C-RNTI) for the UE; an uplink SPS interval (semiPersistSchedIntervalUL); a number of empty transmissions before implicit release (implicitReleaseAfter), if SPS is enabled for the uplink; and/or whether twoIntervalsConfi is enabled or disabled for the uplink in time division duplex (TDD). The RRC information may also include downlink SPS configuration information including: a downlink SPS interval (semiPersistentSchedIntervalDL); and/or a number of configured hybrid automatic repeat request (HARQ) processes for SPS (numberOfConfSPS-Processes), if SPS is enabled for the downlink.

Once the SPS is enabled, such as after receiving SPS configuration information and then activating SPS using a PDCCH activation signal, the UE 102 and the base station may communicate without sending control data for communications scheduled for an SPS session. When SPS for uplink or downlink is disabled by RRC, the corresponding configured grant or configured assignment is discarded. In some embodiments, SPS is supported on a primary cell (PCell) only. Furthermore, SPS may not be supported for radio network communication with the E-UTRAN in combination with an radio network subframe configuration.

In one embodiment, the transceiver component 402 receives a PDSCH communication that includes the above configuration information. In another embodiment, the PDSCH communication may include information required to receive PDSCH communications which do not have a corresponding PDCCH communication. For example, a PDSCH communication may include a scrambling identity $n_{SCID}$ value, virtual cell identity ($N_{ID}^{(i)}$), and/or a transmission parameter set indicator (such as PQI) value. The values may be included in higher layer signaling such as in RRC layer signaling to configure these values or parameters for PDSCH that will be received during an SPS session without a corresponding PDCCH.

The scheduling component 404 configures the UE 102 for an SPS session. The scheduling component 404 may configure the UE 102 for the SPS session based on SPS activation information received by the transceiver component. The SPS activation information may be received by the transceiver component 402 during a PDSCH communication with a corresponding PDCCH communication. In one embodiment, the PDSCH communication comprises a communication dynamically scheduled based on the corresponding PDCCH communication.

During the SPS session, the scheduling component 404 of the UE 102 (and the eNB 106 or other transmitting point) can determine when a next scheduled transmission will occur based on the activation information and/or configuration information discussed above. Thus, control signaling to inform each other of the details of a transmission may no longer be needed. For example, the UE 102 may be able to determine when a communication will be received using the downlink SPS interval and the subframe in which SPS was activated. For downlink SPS, and after the SPS DL assignment is configured, the scheduling component 404 will determine that the Nth assignment occurs in the subframe for which:

$$10 \cdot SFN + subframe = \left[ \begin{array}{l} (SFN_{start\ time} + subframe_{start\ time}) + \\ N \cdot semiPersistentSchedIntervalDL \end{array} \right] modulo\ 10240 \quad (5)$$

$SFN_{start\ time}$ and $subframe_{start\ time}$ are the system frame number and the subframe number, respectively, at the time the configured downlink SPS assignment was initialized or reinitialized.

In one embodiment, the scheduling component 404 configures the UE 102 for the SPS session based on SPS-radio network temporary identifier (SPS-RNTI) activation. For example, the scheduling component 404 may activate an SPS session based on an SPS-RNTI received from the eNB 106. In one embodiment, the scheduling component 404 configures the UE 102 for the SPS session based on a cell-RNTI (C-RNTI). For example, the scheduling component 404 may activate an SPS session based on a C-RNTI received from the eNB 106. The scheduling component 404 may configure the UE 102 for the SPS session based on SPS validation. For example, the UE 102 may validate the PDCCH corresponding to the PDSCH where SPS activation information is received. In one embodiment, the RNTI (such as the C-RNTI or an SPS-RNTI) may be used to scramble signals meant for the specific UE 102.

The scheduling component 404 may configure the UE 102 for the SPS session by scheduling one or more SPS communications, such as an SPS PDSCH (i.e. PDSCH without a corresponding PDCCH/EPDCCH). The scheduling component 404 may schedule the SPS communications based on the SPS activation information as indicated above. For example, the scheduling component 404 may schedule a future SPS communication based on equation (5) above. Each SPS communication may include a physical layer data signal (such as PDSCH) without a corresponding control signal (PDCCH). For example, an SPS communication may include a subframe where physical layer data is transmitted but there may be no corresponding physical layer control signals transmitted within the same subframe. Because the SPS communication is scheduled, there may be no need for a PDCCH to notify the UE 102 or eNB 106 of the communication using a PDCCH specific to the SPS communication. However, parameters for a scrambling identifier (such as $n_{SCID}$), virtual cell identifier ($N_{ID}^{(i)}$), or transmission parameter set indicator (PQI) may still be needed in order to receive the SPS communications.

The reference signal component 406 determines a reference signal sequence for processing an SPS PDSCH communication. The SPS PDSCH communication may include a PDSCH communication scheduled based on the SPS activation information and that does not have a corresponding PDCCH communication. The reference signal component 406 may determine a UE-specific reference signal sequence for a reference signal such as a DM-RS.

In one embodiment, the reference signal component 406 determines the reference signal sequence based on control information provided in DCI in a PDCCH communication. The DCI may include DCI format 1A, 2, 2A, 2B, 2C, or 2D. For example, the reference signal component 406 may determine the reference signal sequence based on a scrambling identity value ($n_{SCID}$) in the DCI corresponding to a PDSCH where SPS activation information was communicated. Thus, the reference signal sequence for the SPS communication may be identical to a reference signal corresponding to PDSCH where the SPS activation information was received. In one embodiment, the virtual cell identity is selected from a plurality of virtual cell identities based on the scrambling identity.

In one embodiment, the reference signal component 406 determines the reference signal sequence based on parameters or values communicated via signaling above the physical layer. For example, the reference signal component 406 may determine the reference signal based on a scrambling identity value ($n_{SCID}$) and/or virtual cell identity ($n_{ID}^{(i)}$) configured using RRC signaling. In one embodiment, the virtual cell identity is selected from a plurality of virtual cell identities $n_{ID}^{(i)}$ based on the scrambling identity.

In one embodiment, the reference signal component 406 determines the reference signal sequence based on predetermined values for parameters needed for the reference signal generation. For example, values for scrambling identities and/or virtual cell identities may be configured and/or stored on a UE 102 and eNB 106 which are used for SPS communications. In one embodiment, the virtual cell identity is selected from a plurality of virtual cell identities based on the scrambling identity. In one embodiment, the reference signal component 406 determines the reference signal sequence based on initialized values determined by another component, such as the initialization component 408. The reference signal sequence determined by the reference signal component 406 may be for a UE-specific reference signal that may be used by the UE 102 for signal estimation and/or demodulation of data signals within a PDSCH.

The initialization component 408 initializes a scrambling sequence used to determine or otherwise generate a reference signal or reference signal sequence. For example, the initialization component 408 may be used to determine an initial value ($c_{init}$) for a pseudo-random sequence generator as indicated by equation (4). The values $n_{SCID}$ and $n_{ID}^{(i)}$ may be derived in a variety of manners. For example, the initialization component 408 may initialize the sequence generator using the values from DCI corresponding to SPS activation information, values configured using RRC layer signaling, and/or predetermined values for SPS communications. The DCI corresponding to the SPS activation information may be DCI format 1A, 2, 2A, 2B, 2C, or 2D. For example, in TM10 the SPS activation may occur in a PDSCH communication corresponding to a PDCCH communication that includes DCI format 2D. In one embodiment, the initialization component 408 initializes the sequence generator using a scrambling identity value that has been predetermined and fixed for all SPS communications. For example, $n_{SCID}=1$ or $n_{SCID}=1$ may be defined for all SPS communications. In one embodiment, the initialization component 408 initializes the sequence generator based on a cell identifier (e.g., $n_{ID}^{cell}$) of a serving cell. However, it may be necessary to have other transmission points use the same cell identifier in order to allow the UE 102 to receive a CoMP transmission message. For example, if one transmission point transmits a reference signal initialized with a first cell identifier and another transmission point transmits a reference signal initialized with a different cell identifier, the UE 102 may not be able to receive both signals.

In one embodiment, the initialization component 408 initializes the sequence generator based on a virtual cell identifier. The virtual cell identifier may be used by all transmission points participating in a CoMP transmission. The virtual cell identifier may be configured based on higher layer signaling or may be a fixed value for SPS communications. For example, a fixed value for the virtual cell identifier may be defined within a standard for all SPS communications or may be a value specific to a UE 102 or eNB 106 which is communicated through higher layer signaling.

The RRC component 410 sends and receives information at the RRC layer. The RRC component 410 may communicate with an eNB 106 to configure a scrambling identity, virtual cell identity, and/or parameter set indicator (PQI). For example, RRC signaling may be used to configure these values in advance of an SPS session or may be provided during an SPS session to configure receipt of a future SPS communication. Thus, even though physical layer control signaling may not be available for SPS communications, RRC signaling may be used to make changes to how SPS communications are transmitted or received.

The signal processing component 412 processes physical layer PDSCH and/or PDCCH communications. In one embodiment, the signal processing component 412 processes PDSCH without corresponding PDCCH based on a reference signal sequence determined by the reference signal component 406. For example, the PDSCH may include one or more demodulation reference signals which are processed by the signal processing component 412 based on a reference signal sequence determined by the reference signal component 406.

The signal processing component 412 may process a PDSCH based on a parameter set indicator (such as PQI) that indicates a transmission parameter set for receiving a signal from a serving transmission point. For example, the transmission parameter set may configure rate matching or other parameters for receiving or processing a PDSCH communication. In one embodiment, the signal processing component 412 may use a parameter set indicator that was signaled in a PDCCH corresponding to SPS activation. In one embodiment, the signal processing component 412 may use a parameter set indicator that includes a predetermined fixed value. For example, the parameter set indicator may be based on a specific value used for all SPS communications. In one embodiment, the signal processing component 412 may use a parameter set indicator configured by the RRC component 410 via RRC signaling.

In one embodiment, the signal processing component 412 may include the reference signal component 406 and/or the initialization component 408. Thus, the signal processing component 412 may process a received SPS PDSCH communication based on a scrambling identity, virtual cell identifier, and/or parameter set indicator. Each of these values may be based on values for SPS activation, values configured through RRC signaling, and/or predetermined fixed values for SPS communications.

The transmission mode component 414 configures the UE 102 for one of a plurality of transmission modes. For example, releases of LTE include a variety of transmission modes which enable different types of communication modes. Release 12 of LTE is scheduled to include TM10 which allows for CoMP transmission/reception. In one embodiment, the transmission mode component 414 configures the UE 102 for reception of CoMP transmission based on signaling received from the eNB 106 or other transmission point. The UE 102 configured for CoMP may be capable of receiving SPS communications that are transmitted by two or more transmission points. In TM10, PDCCH/EPDCCH communications may include DCI that is transmitted based on DCI formats 1A and/or 2D.

Figure 5:
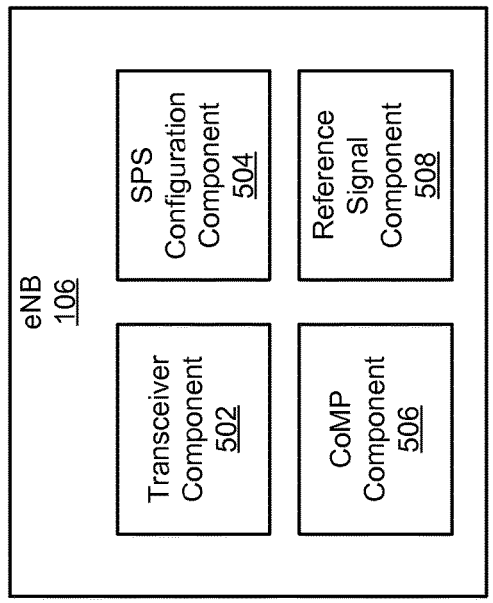
FIG. 5 is a schematic block diagram illustrating components of an evolved Node B (eNB) consistent with embodiments disclosed herein.

FIG. 5 is a block diagram illustrating example components of an eNB 106. The eNB 106 includes a transceiver component 502, an SPS configuration component 504, a CoMP component 506, and a reference signal component 508. According to one embodiment, the eNB 106 determines and transmits the signals and information as discussed in relation to the UE 102 above. In one embodiment, the eNB 106 configures the eNB 106 and/or one or more transmission points to transmit the signals and information as discussed above.

The transceiver component 502 transmits and/or receives information sent between the UE 102 and the eNB 106. The transceiver component 502 transmits PDCCH communications to the UE 102 to control a physical communication layer with the UE 102. The transceiver component 502 transmits PDSCH communications based on information in the PDCCH communications. In one embodiment, the transceiver component 502 transmits PDSCH without corresponding PDCCH. For example, following configuration and/or activation of an SPS session, the transceiver component 502 may transmit scheduled PDSCH communications without transmitting corresponding PDCCH communications.

The SPS configuration component 504 configures the UE 102 for an SPS session. The SPS configuration component 504 may send activation information for an SPS session and provide the activation information to the transceiver component 502 for transmission to the UE 102. In one embodiment, the activation information may include the parameters needed to calculate when a next SPS communication (SPS downlink assignment) will occur.

The SPS configuration component 504 may also determine additional information to be transmitted to the UE 102 for controlling an SPS session. For example, the SPS configuration component 504 may determine a scrambling identity, a virtual cell identifier, and/or parameter set indicator for use during an SPS session. The SPS configuration component 504 may provide determined values to the transceiver component 502 to be communicated to the UE 102. For example, the scrambling identity, virtual cell identifier, and/or parameter set indicator may be provided to the UE 102 via RRC signaling prior to the beginning and/or during an SPS session.

The CoMP component 506 configures a transmission mode of the eNB 106 and/or the UE 102 for CoMP transmissions/receptions. In one embodiment, the CoMP component 506 configures the UE 102 for TM10 in LTE so that the UE 102 can receive CoMP transmission. In one embodiment, the CoMP component 506 determines information to be transmitted to another transmission point to allow the eNB 106 and the other transmission point to coordinate to transmit a signal to the UE 102.

The reference signal component 508 generates a reference signal for transmission by the transceiver component 502 to the UE 102. For example, the reference signal component 508 may generate a reference signal based on a scrambling identity and/or a virtual cell identity as discussed above in relation to the reference signal component 406 of the UE 102. In one embodiment, the reference signal component 508 generates a reference signal based on the same values for a scrambling identity and virtual cell identifier as the UE 102. For example, the reference signal component 508 may generate a reference signal with the same reference signal sequence as determined by the reference signal component 406 of the UE 102.

Figure 6:
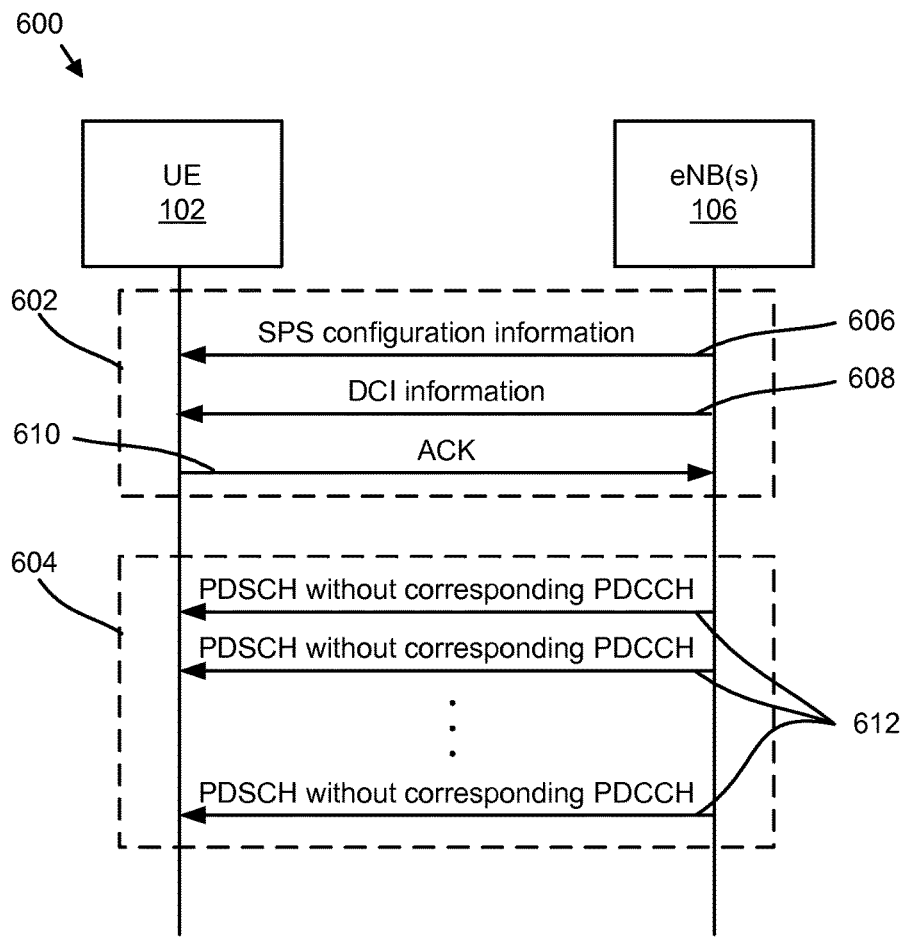
FIG. 6 is a diagram of a communication timeline illustrating communication between a UE and an eNB during semi-persistent scheduling (SPS) activation and an SPS session consistent with embodiments disclosed herein.

FIG. 6 is a communication timeline 600 illustrating communication between a UE 102 and the one or more eNB(s) 106 during SPS activation/configuration 602 and an during SPS session 604. The eNB(s) 106 may include two or more eNBs 106 or transmission points used to coordinate transmission of signals to the UE 102 using CoMP transmission (e.g. using TM10). One of skill in the art will recognize that a single eNB 106 may also be used in some embodiments.

SPS activation/configuration 602 includes the eNB(s) 106 sending 606 SPS configuration information to the UE 102 to configure the UE 102 for an SPS session. The configuration information may include downlink SPS configuration information such as a downlink SPS interval and/or a number of HARQ processes. DCI is sent 608 to activate SPS on the UE 102 so that the UE is prepared to receive a message on a DL channel. The DCI may include a scrambling identity ($n_{SCID}$) and/or a parameter set indicator (PQI). The DCI may be sent 608 in a PDCCH communication. For example, the DCI may be sent 608 in an SPS activation PDCCH. The UE 102 may acknowledge 610 receipt of the SPS configuration information and/or the DCI to confirm that the SPS session 604 will begin.

During the SPS session 604, the eNB(s) 106 send 612 a plurality of PDSCH without corresponding PDCCH. The PDSCH are sent 612 at times indicated by the SPS configuration information and/or based on PDCCH in a subframe where the SPS activated, such as when the DCI 608 was sent 608. For example, the PDSCH may be sent 612 at times determined based on equation (5) above. The UE 102 receives and/or processes the PDSCH without corresponding PDCCH based on one or more SPS parameters. The SPS parameters may be determined based on the DCI sent 606 by the UE 102 during SPS activation/configuration 602, based on values configured through RRC signaling, and/or based on predetermined fixed values for the SPS parameters. For example, a scrambling identity, virtual cell identity, and/or parameter set indicator may be configured in any of the above manners. The UE 102 may receive and/or process the PDSCH without corresponding PDCCH based on these parameters.

FIG. 7 is a flow chart illustrating a method 700 for receiving SPS communications. In one embodiment, the method 700 may be performed by a UE 102 or other wireless mobile device. In one embodiment, a UE 102 is configured for TM10 during the method 700.

The transceiver component 402 receives 702 a PDCCH/EPDCCH corresponding to SPS activation. The PDCCH/EPDCCH conveys a value for $n_{SCID}$. In one embodiment, the PDCCH/EPDCCH conveys a value for $n_{SCID}$ based on DCI format 2D. The PDCCH/EPDCCH may include an SPS activation PDCCH/EPDCH.

The scheduling component 404 configures 704 a DL assignment for receiving SPS PDSCH without a corresponding PDCCH/EPDCCH. The DL assignment is configure 704 based on the received 702 PDCCH/EPDCCH corresponding to SPS activation. For example, the scheduling component 404 may configure 704 the DL assignment based on the subframe in which the PDCCH/EPDCCH was received and/or based on SPS configuration information transmitted by higher layer signaling. In one embodiment, the scheduling component 400 configures 704 a DL assignment in a resource element based on equation (5) above.

The reference signal component 406 generates 706 a reference signal sequence corresponding to the SPS PDSCH. The reference signal component 406 generates 706 the reference signal sequence based on the value for $n_{SCID}$ that corresponds to the subframe for SPS activation. For example, the value for $n_{SCID}$ may correspond to the value received 702 in the PDCCH/EPDCCH in the SPS activation subframe.

The signal processing component 412 processes 708 the SPS PDSCH based on the generated reference signal sequence. For example, the signal processing component 412 may process 708 the SPS PDSCH based on a DM-RS with the same sequence as the generated 70 reference signal sequence. Based on processing of the DM-RS, the signal processing component 412 may process 708 the SPS PDSCH to retrieve and/or demodulate data in the SPS PDSCH.

FIG. 8 is a flow chart illustrating a method 800 for receiving SPS communications. In one embodiment, the method 800 may be performed by a UE 102 or other wireless mobile device. In one embodiment, a UE 102 is configured for TM10 during the method 800.

The method 800 begins and the transceiver component 402 receives 802 an SPS activation PDCCH/EPDCCH that conveys a PQI value. In one embodiment, the SPS activation PDCCH/EPDCCH includes a control communication in which SPS is activated. The PDCCH/EPDCCH may include the PQI value based on a DCI format, such as DCI format 2D. The PQI value may be used for rate matching in the SPS activation subframe.

The scheduling component 404 schedules 804 reception of an SPS PDSCH. The SPS PDSCH includes a PDSCH without a corresponding PDCCH. In one embodiment, the scheduling component 404 schedules 804 reception of the SPS PDSCH for one or more resource elements in a later subframe based on equation (5).

The signal processing component 412 processes 806 the SPS PDSCH based on the PQI value corresponding to SPS activation. For example, the signal processing component 412 may assume that the PQI value for the SPS PDSCH is the same as for SPS activation. Thus, the UE 102 may be able to retrieve data in the SPS PDSCH even though no control signal corresponding to the SPS PDSCH conveying the PQI value was received.

FIG. 9 is a flow chart illustrating a method 900 for providing SPS communications. In one embodiment, the method 900 may be performed by an eNB 106 or other RNC or transmission point. In one embodiment, the eNB 106 provides information to a UE 102 based on CoMP during the method 900.

The CoMP component 506 configures 902 a UE 102 for receiving CoMP transmissions. For example, the CoMP component 506 may configure 902 the UE 102 for TM10 so that the UE 102 receives transmissions of the same or similar signal from multiple transmission points.

The transceiver component 502 transmits 904, in a second subframe, an SPS activation control channel signal. The SPS activation control channel signal activates SPS on the UE 102. For example, the SPS activation control channel signal may configure the UE 102 to receive SPS shared data channel signals without corresponding control channel signals. In one embodiment, the SPS activation control channel signal conveys DCI for the UE to receive signals during the subframe where the SPS activation control channel signal was sent. For example, PDSCH within the same subframe as SPS activation may be transmitted and/or received based on the DCI in the SPS activation control channel signal.

The transceiver component 502 transmits 906, during a second subframe, a shared data channel signal without a corresponding control channel signal. The transceiver component 502 transmits 906 the shared data channel signal based on SPS configuration information determined by the SPS configuration component 504 and/or the SPS activation control channel signal. For example, the SPS configuration information may transmit 908 the shared data channel signal without a corresponding control channel signal in a subframe and or RE determined based on equation (5). In one embodiment, the eNB 16 reuses parameters in the SPS activation control channel signal for the subframe for the shared data channel signal. In one embodiment, the transmitted 906 shared data channel signal and/or DM-RS corresponding to the same subframe as the shared data channel signal are transmitted based on one or more of an $n_{SCID}$ and PQI in the SPS activation control channel subframe.

FIG. 10 is a flow chart illustrating a method 800 for receiving SPS communications. In one embodiment, the method 600 may be performed by a UE 102 or other wireless mobile device.

The scheduling component 404 schedules 1002 one or more SPS communications based on received SPS activation information. For example, the scheduling component 404 may schedule 1002 a PDSCH based on equation (5). In one embodiment, the SPS communications each include a physical layer data communication without a corresponding physical layer control communication. SPS activation information may be received form an eNB 106, another transmission point, or a plurality of eNBs 106 or transmission points.

The transceiver component 404 receives 1004 an SPS communication. The SPS communication may include a physical layer data signal (such as a PDSCH communication) without a corresponding physical layer control signal (such as a PDCCH communication). For example, the SPS communication may include a subframe that includes PDSCH information, a reference signal, and/or no PDCCH information. According to one embodiment, the SPS communication includes a communication assigned based on the SPS activation information.

The initialization component 408 initializes 1006 a scrambling sequence based on a fixed value. In one embodiment, the fixed value includes a scrambling identity used for all SPS communications. For example, the scrambling identity may have a fixed value of $n_{SCID}=0$ or $n_{SCID}=1$ for all SPS communications. Additionally, the initialization component 408 may initialize 1006 the scrambling initialization sequence based on a fixed value for a virtual cell identifier. In another embodiment, a value for a virtual cell identifier may be a cell identifier for a serving cell or other cell involved in CoMP transmission to the UE or the virtual cell identifier may include a virtual cell identifier using higher layer signaling (such as RRC layer signaling).

The reference signal component 406 generates 1008 a reference signal sequence based on the scrambling sequence as initialized 1006 by the initialization component. The reference signal sequence generated 1008 by the reference signal component 406 may include a UE-specific reference signal, such as a demodulation reference signal.

The signal processing component 412 processes 1010 a reference signal of the received 1004 SPS communication based on the generated reference signal sequence. In one embodiment, the signal processing component 412 processes the reference signal for channel estimation or other channel attributes based on the generated reference signal sequence. In one embodiment, the signal processing component 412 may also process 1010 physical layer data signals (such as PDSCH) based on the generated reference signal sequence. For example, the signal processing component 412 may estimate a downlink channel based on the generated reference signal and process a PDSCH based on the channel estimation. The signal processing component 412 may also process 1010 the PDSCH based on a parameter set indicator. The parameter set indicator may include a value included in DCI corresponding to the SPS activation information, a value configured via higher layer signaling, or a predetermined fixed value for the parameter set indicator (for example, PQI=0, PQI=1, PQI=2, or PQI=3) that is used for all SPS communications.

Figure 11:
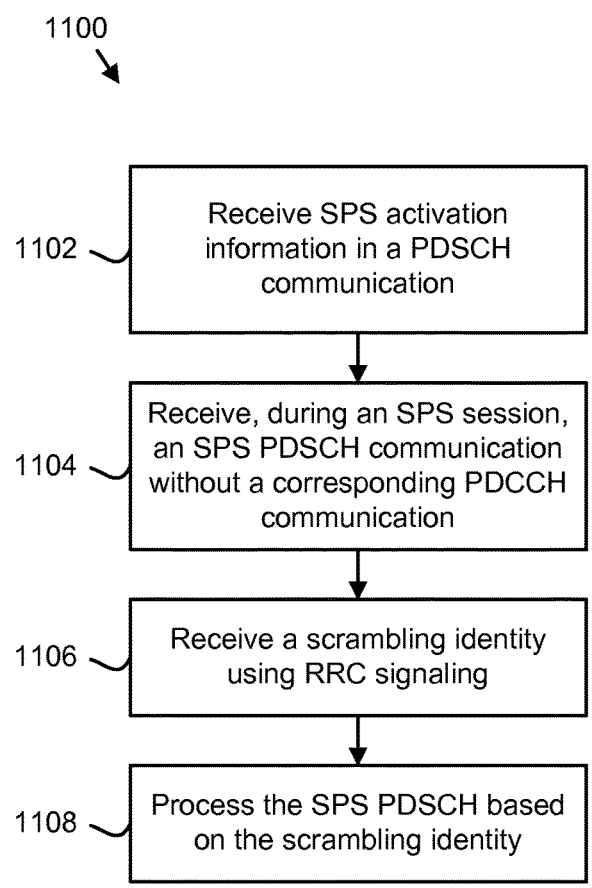
FIG. 11 is a schematic flow chart diagram illustrating yet another method for receiving SPS communications consistent with embodiments disclosed herein.
Figure 12:
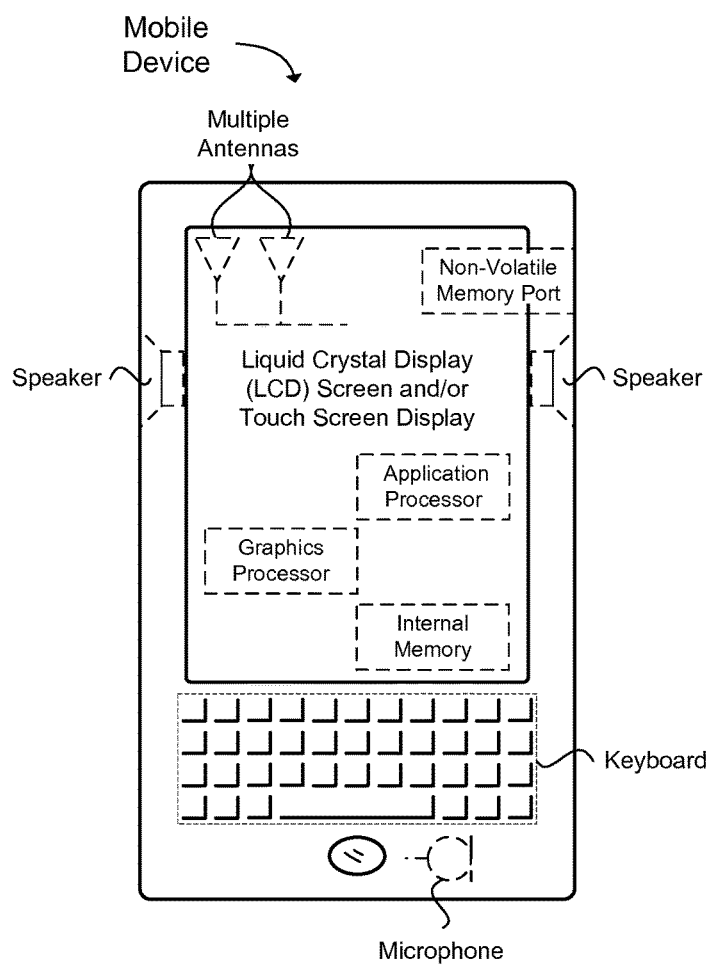
FIG. 12 is a schematic diagram of a wireless mobile device consistent with embodiments disclosed herein.

FIG. 11 is a flow chart illustrating a method 900 for receiving SPS communications. In one embodiment, the method 900 may be performed by a UE 102 or other wireless mobile device.

The scheduling component 404 receives 1102 SPS activation information in a PDSCH communication. The scheduling component 404 may configure the UE 102 for SPS by assigning one or more DL resource elements for receipt of an SPS PDSCH communication without a corresponding PDCCH communication based on the SPS activation information. In one embodiment, the PDSCH communication has a corresponding PDCCH communication for assigning the PDSCH for transmission on the DL channel and for providing DCI configuring the UE 102 to receive the PDSCH.

The transceiver component 402 receives 1104 an SPS PDSCH communication that does not have a corresponding PDCCH communication. For example, the transceiver component 402 may receive 1104 an SPS PDSCH communication that was scheduled for receipt during an SPS session.

The RRC component 410 receives 1106 one or more DL channel parameters for receiving the SPS PDSCH. In one embodiment, the RRC component 410 receives 1106 the DL channel parameters including one or more of a scrambling identity, virtual cell identity, and parameter set identifier for receiving and/or processing any SPS PDSCH. In one embodiment, one or more of the scrambling identity, virtual cell identity, and parameter set identifier may be a predetermined fixed value or a value corresponding to SPS activation. For example, the scrambling identity and virtual cell identity may be received 1106 via RRC signaling while the parameter set identifier may have a predetermined fixed value.

The signal processing component 412 processes 1108 the SPS PDSCH based on the DL channel parameters configured through RRC signaling. For example, the signal processing component 412 may process 1108 the SPS PDSCH based on channel estimation determined from a demodulation reference signal. The channel estimation may be determined based on a scrambling identity configured 1106 through RRC signaling and the signal processing component 412 may process 1108 the SPS PDSCH based on the determined channel estimation. Similarly, the signal processing component 412 may process 1108 the SPS PDSCH based on a parameter set indicator that is configured via RRC signaling, is a predetermined fixed value, or is the same as a value corresponding to SPS activation.

FIG. 11 provides an example illustration of a mobile device, such as a UE, a mobile station (MS), a mobile wireless device, a mobile communication device, a tablet, a handset, or another type of mobile device. The mobile device can include one or more antennas configured to communicate with a transmission station, such as a base station (BS), an eNB, a base band unit (BBU), an RRH, a remote radio equipment (RRE), a relay station (RS), a radio equipment, or another type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 11 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Example Embodiments

The present disclosure provides a method for usage of DM-RS for SPS PDSCH transmission (i.e. PDSCH without PDCCH). Note that the term "PDCCH" here encompasses either legacy PDCCH or EPDCCH.

For TM10, the parameter $n_{SCID}$ for DM-RS sequence initialization is given by DCI format 2C. Another parameter $n_{ID}^{(n_{SCID})}$ is determined by a function of $n_{SCID}$. The $n_{ID}^{(i)}$ (i=0, 1) are configured by higher layer signaling and $n_{SCID}$ determines the used parameter for initialization for $n_{ID}^{(n_{SCID})}$.

The parameter $n_{ID}^{(i)}$ can be used as virtual cell ID having the range of 0 to 503. This can facilitate CoMP operation regardless of physical cell ID. For example, a UE can receive the DM-RS from cell B while the serving cell is cell A.

DCI format 2C or 2D can be used for SPS activation. The DCI includes $n_{SCID}$ so that the UE can be aware of the DM-RS sequence initialization value. However, for the following SPS PDSCH transmission, the UE would not know the DM-RS sequence initialization value since there is no PDCCH carrying $n_{SCID}$.

A new DCI signaling can be introduced for PQI. For example, the following two options can be considered. For the first option, a new DCI bit PQI is added to the contents of DCI format 2C to form the DCI format for TM10. This new bit, together with $n_{SCID}$ dynamically selects the PDSCH RE mapping and quasi-co-location parameter set among the four parameter sets configured by higher layers. For example, for TP0 $n_{SCID}=0$ and PQI=0; for TP1 $n_{SCID}=0$ and PQI=1, for TP2 $n_{SCID}=1$ and PQI=0, for TP3 $n_{SCID}=1$ and PQI=1.

For the second option, two new DCI bits for PQI are added to the contents of DCI format 2C to form the DCI format for TM10. For example, for TP0 PQI=0; for TP1 PQI=1, for TP2 PQI=2, for TP3 PQI=3.

Option 1

For PDSCH without the corresponding PDCCH/EPDCCH in a subframe, $n_{ID}^{(i)}=n_{ID}^{DMRS,i}$ is used for DM-RS sequence generation and $n_{SCID}$ uses the same one signaled in PDCCH for SPS activation (i.e. by SPS-RNTI or by C-RNTI with SPS-activation validation). And/or, the same PQI can be assumed for PDSCH without the corresponding PDCCH/EPDCCH in a subframe as that given in PDCCH for SPS activation.

A UE configured in TM10 can be configured with scrambling identities, $n_{ID}^{(DMRS,i)}$, i=0, 1, by higher layers for UE-specific reference signal generation.

In other words, the same parameters of DM-RS for sequence initialization applies in the case that a PDSCH is transmitted without a corresponding PDCCH/EPDCCH. The parameter $n_{SCID}$ of PDSCH without a corresponding PDCCH/EPDCCH uses that in PDCCH/EPDCCH for SPS-activation.

If the parameter $n_{SCID}$ is changed in subframe by subframe, the resultant generated sequences are changed accordingly. For example, if $n_{SCID}=0$ ($\rightarrow n_{ID}^{(0)}$) is used in a certain subframe #a, the resultant DM-RS sequence is different from that for another subframe #b using $n_{SCID}=1$ ($\rightarrow n_{ID}^{(1)}$). This means that DM-RS is transmitted from cell#A in subframe#a and DM-RS is transmitted from cell#B in subframe#b. It is not desirable operations under CoMP transmission. Therefore, in order that the UE receives SPS-PDSCH from the same TP, the DM-RS sequence in the subframe for SPS activation needs to be same as in the subframe for SPS-PDSCH (i.e. PDSCH without a corresponding PDCCH).

Option 2

For PDSCH without the corresponding PDCCH/EPDCCH in a subframe, $n_{ID}^{(i)}=n_{ID}^{cell}$ is used for DM-RS sequence generation and $n_{SCID}$ is the fixed value as either 0 or 1 (e.g. $n_{SCID}=0$ or $n_{SCID}=1$). And/or, the same PQI as the serving cell (or the cell having $n_{ID}^{cell}$) can be assumed for PDSCH without the corresponding PDCCH/EPDCCH in a subframe. In other words, if there is no PDCCH for PDSCH in a subframe, the UE will assume $n_{SCID}=0$ (or $n_{SCID}=1$) and $n_{ID}^{(i)}=n_{ID}^{cell}$. And/or, PQI=0 (may be serving cell).

Option 3

For PDSCH without the corresponding PDCCH/EPDCCH in a subframe, the predetermined values of $n_{ID}^{(i)}$ and $n_{SCID}$ are used for DM-RS sequence generation. And/or, the PQI to be assumed for PDSCH without the corresponding PDCCH/EPDCCH can be predetermined. For example, $n_{ID}^{(i)}$ can be configured by higher layer signaling or predetermined (e.g. $n_{ID}^{(i)}=n_{ID}^{(0)}$ or $n_{ID}^{(i)}=n_{ID}^{(1)}$). The value $n_{SCID}$ can be predetermined by either 0 or 1 (i.e. $n_{SCID}=0$ or $n_{SCID}=1$). And/or, PQI=0, 1, 2, or 3.

Option 4

The eNB independently configures $\{n_{SCID}\}$ or $\{n_{SCID}$ and/or $n_{ID}^{(i)}\}$ for all SPS transmission (including SPS activation). And/or, the PQI to be assumed for PDSCH without the corresponding PDCCH/EPDCCH can be configured by RRC signaling. By doing this, the reception from same TP during a SPS session can be assured.

In addition, let us define the following statements:

Statement 1: the same PQI can be assumed for PDSCH without the corresponding PDCCH/EPDCCH in a subframe as that given in PDCCH for SPS activation.

Statement 2: the same PQI as the serving cell (or the cell having $n_{ID}^{cell}$) can be assumed for PDSCH without the corresponding PDCCH/EPDCCH in a subframe.

Statement 3: the PQI to be assumed for PDSCH without the corresponding PDCCH/EPDCCH can be predetermined.

Given the above statements, the present disclosure teaches any combination (by "and/or") of above options and the above statements. For example, as a combination of Option 1 and Statement 3: For PDSCH without the corresponding PDCCH/EPDCCH in a subframe, $n_{ID}^{(i)}= n_{ID}^{(DMRS,i)}$ is used for DM-RS sequence generation and $n_{SCID}$ uses the same one signaled in PDCCH for SPS-activation (i.e. by SPS-RNTI or by C-RNTI with SPS-activation validation). And/or, the PQI to be assumed for PDSCH without the corresponding PDCCH/EPDCCH can be predetermined.

EXAMPLES

The following examples pertain to further embodiments.

Example 1 is a UE that receives, in a first subframe, a PDCCH/EPDCCH corresponding to SPS activation. The PDCCH/EPDCCH conveys a value of $n_{SCID}$. The UE configures, based on the SPS activation, a DL assignment in a second subframe for receiving an SPS PDSCH without a corresponding PDCCH/EPDCCH. The UE determines a reference signal sequence corresponding to the SPS PDSCH using $n_{SCID}$ derived from the PDCCH/EPDCCH corresponding to the associated SPS activation. The UE receives the SPS PDSCH in a second subframe and processes the SPS PDSCH based on the reference signal sequence for the SPS PDSCH in the second subframe using the $n_{SCID}$ derived from the PDCCH/EPDCCH corresponding to the associated SPS activation. The UE is configured for TM10.

In Example 2, TM10 of Example 1 can optionally include CoMP transmission or reception and one or more of the PDSCH and the PDCCH/EPDCCH comprise CoMP transmissions.

In Example 3, the UE of Examples 1-2 is optionally configured to monitor a DCI format and the value of $n_{SCID}$ is conveyed according to DCI format 2D.

In Example 4, the UE of Examples 1-3 can optionally determine the reference signal sequence by determining the reference signal sequence based on a virtual cell identity of $n_{ID}^{(nSCID)}$. The virtual cell identity may be selected based on the value for $n_{SCID}$ and may correspond to SPS activation.

In Example 5, the $n_{ID}^{(nSCID)}$ of Example 4 is configured by signaling on a layer above the physical layer.

In Example 6, the PDCCH/EPDCCH of Examples 1-5 can optionally convey a value for PQI. The processing of the SPS PDSCH may include processing based on a transmission parameter set indicated by the value for the PQI.

In Example 7, the UE of Examples 1-6 can optionally process the SPS PDSCH by processing based on a transmission parameter set indicated by a value for PQI configured based on RRC layer signaling.

Example 8 is a UE that includes a transceiver component, a scheduling component, and a signal processing component. The transceiver component is configured to receive, in a first subframe, an SPS activation PDCCH/EPDCCH transmission. The SPS activation PDCCH/EPDCCH transmission conveys a value for a PQI. The scheduling component is configured to schedule reception of an SPS PDSCH transmission. The SPS PDSCH transmission includes a PDSCH transmission without a corresponding PDCCH/EPDCCH transmission. The signal processing component is configured to process the SPS PDSCH transmission based on the value for the PQI corresponding to SPS activation. The SPS PDSCH is received by the transceiver component during a second subframe and the UE is configured for TM10.

In Example 9, the TM10 of Example 8 includes CoMP transmission or reception and one or more of the SPS PDSCH and the SPS activation PDCCH/EPDCCH comprise CoMP transmissions.

In Example 10, the UE of Examples 8-9 can be optionally configured to monitor a DCI format and wherein the value for the PQI is conveyed according to DCI format 2D.

In Example 11, the SPS activation PDCCH/EPDCCH of Examples 8-10 further conveys a value for a scrambling identity. The signal processing component may process the SPS PDSCH based on a reference signal sequence initiated using the value for the scrambling identity.

In Example 12, the UE of Examples 8-11 can optionally include a reference signal component that determines a reference signal sequence based on a scrambling identity and a virtual cell identity.

In Example 13, the UE of Examples 8-12 can optionally include an RRC component configured to configure one or more of the scrambling identity and the virtual cell identity using RRC layer signaling.

Example 14 is an eNB that configures a UE for CoMP transmission. The eNB transmits, in a first subframe, an SPS activation control channel signal. The SPS activation control channel signal conveys DCI for the UE to receive signals in the first subframe. The eNB transmits a shared data channel signal without a corresponding control channel signal based on the DCI corresponding to the SPS activation control channel signal. The shared data channel signal is transmitted in a second subframe.

In Example 15, the DCI of Example 14 conveys one or more of a scrambling identity ($n_{SCID}$) and a PQI based on format 2D. The shared data channel signal is transmitted based on one or more of the $n_{SCID}$ and the PQI.

Example 16 is a mobile wireless device that includes a transceiver component, an initialization component, a reference signal component, and a signal processing component. The transceiver component is configured to receive a scheduled communication on a shared channel without a corresponding control communication on a control channel. The scheduled communication comprises a CoMP transmission. The initialization component is configured to initialize a pseudo-random sequence based on a scrambling identity. The scrambling identity includes a predetermined fixed value. The reference signal component is configured to determine a reference signal sequence based on the pseudo-random sequence. The signal processing component is configured to process a demodulation reference signal corresponding to the scheduled communication based on the determined reference signal sequence.

In Example 17, initializing the pseudo-random sequence in Example 16 is optionally further based on a cell identifier of a serving cell.

In Example 18, initializing the pseudo-random sequence in Example 16 optionally is further based on a virtual cell identifier. The virtual cell identifier includes a predetermined fixed value for scheduled communications.

In Example 19, the pseudo-random sequence of Example 16 is optionally initialized based on a virtual cell identifier configured by higher layer signaling.

In Example 20, receiving the scheduled communication in Examples 16-19 optionally include receiving based on a parameter set indicator that indicates a transmission parameter set for receiving a signal from a serving transmission point. The parameter set indicator includes a predetermined fixed value for scheduled communications.

In Example 21, processing the demodulation reference signal in Examples 16-20 optionally includes estimating a channel (channel estimation) for the demodulation reference signal. The signal processing component can optionally process the scheduled communication based on the channel estimation.

Example 22 is a method for an SPS process. The method includes receiving, in a first subframe, a PDCCH/EPDCCH corresponding to SPS activation. The PDCCH/EPDCCH conveys a value of $n_{SCID}$. The method includes configuring, based on the SPS activation, a DL assignment in a second subframe for receiving an SPS PDSCH without a corresponding PDCCH/EPDCCH. The method further includes determines a reference signal sequence corresponding to the SPS PDSCH using $n_{SCID}$ derived from the PDCCH/EPDCCH corresponding to the associated SPS activation. The method further includes receiving the SPS PDSCH in a second subframe and processes the SPS PDSCH based on the reference signal sequence for the SPS PDSCH in the second subframe using the $n_{SCID}$ derived from the PDCCH/EPDCCH corresponding to the associated SPS activation. The UE is configured for TM10.

In Example 23, TM10 of Example 22 can optionally include CoMP transmission or reception and one or more of the PDSCH and the PDCCH/EPDCCH comprise CoMP transmissions.

In Example 24, the method of Examples 22-23 can optionally include monitoring a DCI format and the value of $n_{SCID}$ is conveyed according to DCI format 2D.

In Example 25, the method of Examples 22-24 can optionally include determining the reference signal sequence by determining the reference signal sequence based on a virtual cell identity of $n_{ID}^{(nSCID)}$. The virtual cell identity may be selected based on the value for $n_{SCID}$ and may correspond to SPS activation.

In Example 26, the $n_{ID}^{(nSCID)}$ of Example 25 is configured by signaling on a layer above the physical layer.

In Example 27, the PDCCH/EPDCCH of Examples 22-26 can optionally convey a value for PQI. The processing of the SPS PDSCH may include processing based on a transmission parameter set indicated by the value for the PQI.

In Example 28, the method of Examples 22-27 can optionally include processing the SPS PDSCH by processing based on a transmission parameter set indicated by a value for PQI configured based on RRC layer signaling.

Example 29 a method for an SPS process includes receiving, in a first subframe, an SPS activation PDCCH/EPDCCH transmission. The SPS activation PDCCH/EPDCCH transmission conveys a value for a PQI. The method includes scheduling reception of an SPS PDSCH transmission. The SPS PDSCH transmission includes a PDSCH transmission without a corresponding PDCCH/EPDCCH transmission. The method includes processing the SPS PDSCH transmission based on the value for the PQI corresponding to SPS activation. The SPS PDSCH is received during a second subframe and the UE is configured for TM10.

In Example 30, the TM10 of Example 29 includes CoMP transmission or reception and one or more of the SPS PDSCH and the SPS activation PDCCH/EPDCCH comprise CoMP transmissions.

In Example 31, the method of Examples 29-30 can optionally include monitoring a DCI format and wherein the value for the PQI is conveyed according to DCI format 2D.

In Example 32, the SPS activation PDCCH/EPDCCH of Examples 29-31 further conveys a value for a scrambling identity. The method may include processing the SPS PDSCH based on a reference signal sequence initiated using the value for the scrambling identity.

In Example 33, the method of Examples 29-32 can optionally include determining a reference signal sequence based on a scrambling identity and a virtual cell identity.

In Example 34, the method of Examples 29-33 can optionally include configuring one or more of the scrambling identity and the virtual cell identity using RRC layer signaling.

Example 35 is a method for an SPS process that includes configuring a UE for CoMP transmission. The method includes transmitting, in a first subframe, an SPS activation control channel signal. The SPS activation control channel signal conveys DCI for the UE to receive signals in the first subframe. The method includes transmitting a shared data channel signal without a corresponding control channel signal based on the DCI corresponding to the SPS activation control channel signal. The shared data channel signal is transmitted in a second subframe.

In Example 36, the DCI of Example 35 conveys one or more of a scrambling identity ($n_{SCID}$) and a PQI based on format 2D. The shared data channel signal is transmitted based on one or more of the $n_{SCID}$ and the PQI.

Example 37 is a method for an SPS process that includes receiving a scheduled communication on a shared channel without a corresponding control communication on a control channel. The scheduled communication comprises a CoMP transmission. The method includes initializing a pseudo-random sequence based on a scrambling identity. The scrambling identity includes a predetermined fixed value. The method includes determining a reference signal sequence based on the pseudo-random sequence. The method further includes processing a demodulation reference signal corresponding to the scheduled communication based on the determined reference signal sequence.

In Example 38, initializing the pseudo-random sequence in Example 39 is optionally further based on a cell identifier of a serving cell.

In Example 39, initializing the pseudo-random sequence in Example 39 optionally is further based on a virtual cell identifier. The virtual cell identifier includes a predetermined fixed value for scheduled communications.

In Example 40, the pseudo-random sequence of Example 39 is optionally initialized based on a virtual cell identifier configured by higher layer signaling.

In Example 41, receiving the scheduled communication in Examples 37-40 can optionally include receiving based on a parameter set indicator that indicates a transmission parameter set for receiving a signal from a serving transmission point. The parameter set indicator includes a predetermined fixed value for scheduled communications.

In Example 42, processing the demodulation reference signal in Examples 37-41 optionally includes estimating a channel (channel estimation) for the demodulation reference signal. The signal processing component can optionally process the scheduled communication based on the channel estimation.

Example 43 is an apparatus comprising means to perform a method of any of Examples 22-42.

Example 44 is a machine readable storage including machine-readable instructions, when executed, to implement a method or realize an apparatus of any of Examples 27-43.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced herein may be stored on a machine-readable storage medium and may be executed by one or more general-purpose or special-purpose programmable microprocessors. A "machine-readable medium," as the term is used herein, includes any mechanism that can store information in a form that is accessible by a machine (a machine may be, for example, a computer, a network device, a cellular phone, a PDA, a manufacturing tool, any device with one or more processors, etc.). For example, a machine-accessible medium includes recordable/non-recordable media (e.g., read-only memory (ROM), random access memory (RAM), magnetic disk storage media, optical storage media, flash memory devices, etc.).

The term "logic," as used herein, can include, for example, special-purpose hardwired circuitry, software and/or firmware in conjunction with programmable circuitry, or a combination thereof.

Although the present disclosure includes reference to specific example embodiments, it will be recognized that the claims are not limited to the embodiments described, but can be practiced with modification and alteration within the spirit and scope of the appended claims. Accordingly, the specification and drawings are to be regarded in an illustrative sense rather than a restrictive sense.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom VLSI circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, procedure, or function. Nevertheless, the executables of an identified component need not be physically located together, but may comprise disparate instructions stored in different locations which, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. An apparatus for a user equipment (UE) comprising:
a memory configured to store a value of $n_{SCID}$; and
logic, at least a portion of which comprises circuitry, to:
decode a physical downlink control channel or enhanced physical downlink control channel (PDCCH/EPDCCH) corresponding to semi-persistent scheduling (SPS) activation in a first subframe, wherein the PDCCH/EPDCCH conveys a value of $n_{SCID}$;
configure, based on the SPS activation, a downlink (DL) assignment in a second subframe that is different than the first subframe, wherein the UE is configured for transmission mode 10 (TM10);
identify a UE-specific reference signal in the second subframe, wherein the UE-specific reference signal is associated with an SPS physical downlink shared channel (PDSCH) in the second subframe, wherein the SPS PDSCH is without a corresponding PDCCH/EPDCCH;
determine a reference signal sequence corresponding to the UE-specific reference signal in the second subframe using the value of $n_{SCID}$ derived from the PDCCH/EPDCCH corresponding to SPS activation in the first subframe, wherein to determine the reference signal sequence, the logic is configured to generate the reference signal sequence based on a virtual cell identity of $n_{ID}^{(n_{SCID})}$ selected based on the value for $n_{SCID}$, the virtual cell identity corresponding to the SPS activation; and
process the SPS PDSCH based on the UE-specific reference signal and the reference signal sequence.

2. The apparatus of claim 1, wherein the UE is configured for coordinated multipoint (CoMP) transmission or reception, and wherein one or more of the SPS PDSCH and the PDCCH/EPDCCH corresponding to SPS activation comprise CoMP transmissions.

3. The apparatus of claim 1, wherein the logic is further configured to monitor a downlink control information (DCI) format and wherein the value of $n_{SCID}$ is conveyed according to DCI format 2D.

4. The apparatus of claim 1, wherein the $n_{ID}^{(n_{SCID})}$ is configured by signaling on a layer above the physical layer.

5. The apparatus of claim 1, wherein the PDCCH/EPDCCH corresponding to SPS activation further conveys a value for a PDSCH resource element (RE) mapping quasi co-location indicator (PQI), and wherein the logic is further configured to process the SPS PDSCH based on a transmission parameter set indicated by the value for the PQI.

6. The apparatus of claim 1, wherein the logic is further configured to process the SPS PDSCH based on a transmission parameter set indicated by a value for a PDSCH resource element (RE) mapping quasi co-location indicator (PQI), wherein the value for the PQI is configured based on RRC layer signaling.

* * * * *